United States Patent
Fukuda

(10) Patent No.: US 7,636,174 B2
(45) Date of Patent: Dec. 22, 2009

(54) JOB INFORMATION MANAGING SYSTEM, JOB INFORMATION MANAGING METHOD, PROGRAM FOR IMPLEMENTING THE METHOD, AND STORAGE MEDIUM STORING THE PROGRAM

(75) Inventor: Hiroki Fukuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 854 days.

(21) Appl. No.: 11/116,984

(22) Filed: Apr. 28, 2005

(65) Prior Publication Data
US 2005/0243366 A1 Nov. 3, 2005

(30) Foreign Application Priority Data
Apr. 28, 2004 (JP) ............................. 2004-134549

(51) Int. Cl.
*G06F 3/12* (2006.01)
*G06G 17/30* (2006.01)
*A01K 5/02* (2006.01)

(52) U.S. Cl. .................... 358/1.15; 358/1.14; 707/8; 707/9; 705/29

(58) Field of Classification Search ......... 358/1.1–1.18; 399/1, 79–80
See application file for complete search history.

(56) References Cited

U.S. PATENT DOCUMENTS

| 5,383,139 | A  | * | 1/1995 | Saji et al. ............... 361/679.09 |
| 6,583,888 | B1 | * | 6/2003 | Salgado et al. ............. 358/1.15 |
| 7,149,711 | B2 | * | 12/2006 | Kojima et al. ................. 705/26 |
| 7,206,765 | B2 | * | 4/2007 | Gilliam et al. ................ 705/51 |
| 2002/0048036 | A1 | * | 4/2002 | Nakagawa et al. ......... 358/1.14 |
| 2002/0161831 | A1 | * | 10/2002 | Nakaoka et al. ............. 709/203 |
| 2003/0030835 | A1 | * | 2/2003 | Yoshida et al. ............. 358/1.14 |
| 2003/0137685 | A1 | * | 7/2003 | Meade et al. ............... 358/1.14 |
| 2003/0197885 | A1 | * | 10/2003 | Takeo ........................ 358/1.14 |

FOREIGN PATENT DOCUMENTS

JP 2001-282475 A 10/2001

* cited by examiner

*Primary Examiner*—Twyler L Haskins
*Assistant Examiner*—Dennis Dicker
(74) *Attorney, Agent, or Firm*—Rossi, Kimms & McDowell LLP

(57) ABSTRACT

A job information managing system which can improve convenience in managing and using management codes and improve user-friendliness and convenience in printing management using the management codes. A client computer generates a job for a printer and generates job information on the job. A server computer acquires the job information from the client computer and manages the job information. The client computer creates a label in association with a plurality of management codes for managing job information. The created label is sent to the server computer and stored in association with the plurality of management codes.

14 Claims, 36 Drawing Sheets

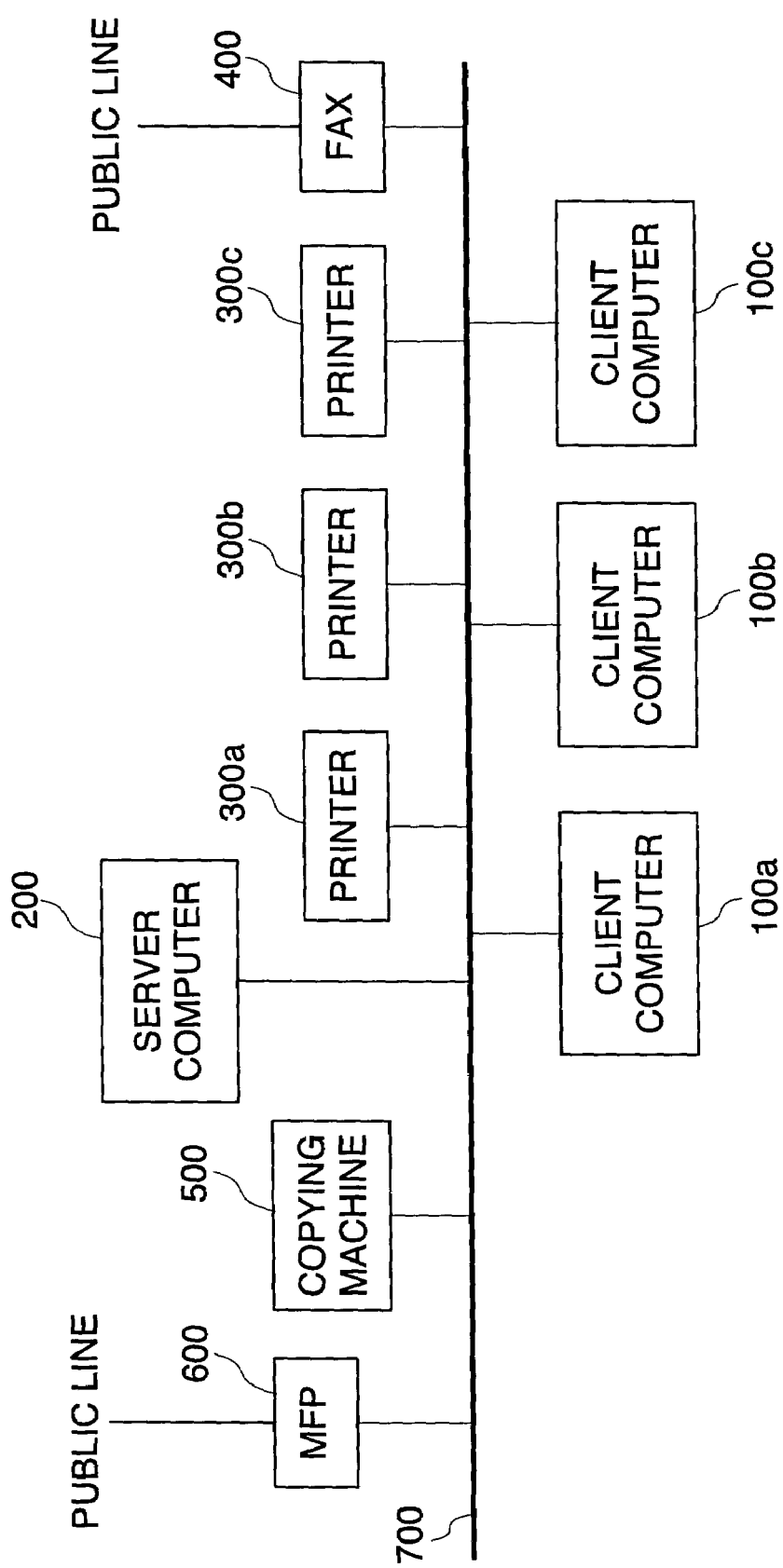

FIG. 3

HOOK LOG

| JOB ID | 520 |
|---|---|
| APPLICATION NAME | WORD MEIJIN |
| NUMBER OF LOGICAL PAGES | 9 |
| DOCUMENT NAME | abcd0001 |
| ORIGINAL DOCUMENT NAME | 2001 ANNUAL REPORT |
| PROCESSED | NO |
| TYPE | HOOK |
| START TIME | 2001/12/20 21:11 |
| FINISH TIME | 2001/12/20 21:21 |

FIG. 4

DRIVER LOG

| | |
|---|---|
| JOB ID | 520 |
| SHEET SIZE | A4 |
| N-up | 4 |
| NUMBER OF PHYSICAL PAGES | 3 |
| DOUBLE-SIDED/ONE-SIDED | DOUBLE-SIDED |
| PROCESSED | NO |
| TYPE | DRIVER |
| PORT NAME | IP_10.166.30.2 |
| PRINTER DRIVER NAME | Acrobat writer 3.0 |
| START TIME | 2001/12/20 21:21 |
| FINISH TIME | 2001/12/20 21:31 |

FIG. 5

API LOG

| | |
|---|---|
| JOB ID | 520 |
| OWNER NAME | YAMADA |
| SPOOL DATA SIZE | 56789 |
| NUMBER OF LOGICAL PAGES | 3 |
| DOUBLE-SIDED/ONE-SIDED | DOUBLE-SIDED |
| PROCESSED | NO |
| TYPE | API |
| START TIME | 2001/12/20 21:31 |
| FINISH TIME | 2001/12/20 21:41 |

FIG. 6

MONITOR LOG

| | |
|---|---|
| JOB ID | 520 |
| PROCESSED | NO |
| TYPE | MONITOR |
| START TIME | 2001/12/20 21:41 |
| FINISH TIME | 2001/12/20 21:51 |

FIG. 7

MERGE LOG

| JOB ID | 520 |
|---|---|
| APPLICATION NAME | WORD MEIJIN |
| NUMBER OF LOGICAL PAGES | 9 |
| DOCUMENT NAME | abcd0001 |
| ORIGINAL DOCUMENT NAME | 2001 ANNUAL REPORT |
| PROCESSED | NO |
| TYPE | MERGE |
| START TIME | 2001/12/20 21:11 |
| FINISH TIME | 2001/12/20 21:21 |
| SHEET SIZE | A4 |
| N-up | 4 |
| NUMBER OF PHYSICAL PAGES | 3 |
| DOUBLE-SIDED/ONE-SIDED | DOUBLE-SIDED |
| OWNER NAME | YAMADA |
| SPOOL DATA SIZE | 56789 |
| PORT NAME | IP-10.166.30.2 |
| PRINTER DRIVER NAME | Acrobat writer 3.0 |

FIG. 8

APPARATUS LOG

| JOB ID | 520 |
|---|---|
| NUMBER OF DISCHARGED PAGES | 3 |
| NUMBER OF DISCHARGED SHEETS | 2 |
| PROCESSED | NO |
| TYPE | PRINTER |
| START TIME | 2001/12/20 22:01 |
| FINISH TIME | 2001/12/20 22:04 |
| DOCUMENT NAME | abcd0001 |

FIG. 9

| JOB ID | 520 |
|---|---|
| NUMBER OF DISCHARGED PAGES | 3 |
| NUMBER OF DISCHARGED SHEETS | 2 |
| PROCESSED | NO |
| TYPE | PRINTER |
| START TIME | 2001/12/20 22:01 |
| FINISH TIME | 2001/12/20 22:04 |
| DOCUMENT NAME | 2001 ANNUAL REPORT |

FIG. 10

FINAL LOG

| | |
|---|---|
| JOB ID | 520 |
| APPLICATION NAME | WORD MEIJIN |
| LOGICAL NUMBER OF PAGES | 9 |
| DOCUMENT NAME | abcd0001 |
| PROCESSED | NO |
| TYPE | MERGE |
| START TIME | 2001/12/20 21:11 |
| FINISH TIME | 2001/12/20 21:21 |
| SHEET SIZE | A4 |
| N-up | 4 |
| NUMBER OF PHYSICAL PAGES | 3 |
| DOUBLE-SIDED/ONE-SIDED | DOUBLE-SIDED |
| OWNER NAME | YAMADA |
| SPOOL DATA SIZE | 56789 |
| PORT NAME | IP-10.166.30.2 |
| PRINTER DRIVER NAME | Acrobat writer 3.0 |
| NUMBER OF PAGES TO BE DISCHARGED | 3 |
| NUMBER OF SHEETS TO BE DISCHARGED | 2 |

FIG. 20

| FIRST CLASS | USAGE RIGHT |
|---|---|
| A1 | USER 1, USER 2, USER 3, ··· |
| A2 | USER 1, USER 2, ··· |
| A3 | USER 1, USER 2, USER 3, ··· |
| A4 | USER 4 |
| A5 | USER 5 |
| ····· | |
| SECOND CLASS | USAGE RIGHT |
| B1 | USER 1, USER 2, USER 3, ··· |
| B2 | USER 2, USER 3, ··· |
| B3 | USER 1, USER 2, USER 3, ··· |
| B4 | USER 4 |
| B5 | USER 5 |
| ····· | |
| THIRD CLASS | USAGE RIGHT |
| C1 | USER 1, USER 2, USER 3, ··· |
| C2 | USER 2, USER 3, ··· |
| C3 | USER 2, USER 3, ··· |
| C4 | USER 4 |
| C5 | USER 5 |
| ····· | |

FIG. 21

| LABEL | FIRST CLASS | SECOND CLASS | THIRD CLASS | USAGE RIGHT |
|---|---|---|---|---|
| L1 | A4 | B3 | C1 | USER 1, USER 2, USER 3, ... |
| L2 | A2 | B2 | C5 | USER 4, USER 5, ... |
| L3 | A5 | B4 | C3 | USER 1, USER 2, USER 4, ... |
| L4 | A3 | B4 | C4 | USER 1, USER 2, USER 3, ... |
| L5 | A8 | B5 | C2 | USER 1, USER 2, USER 3, ... |

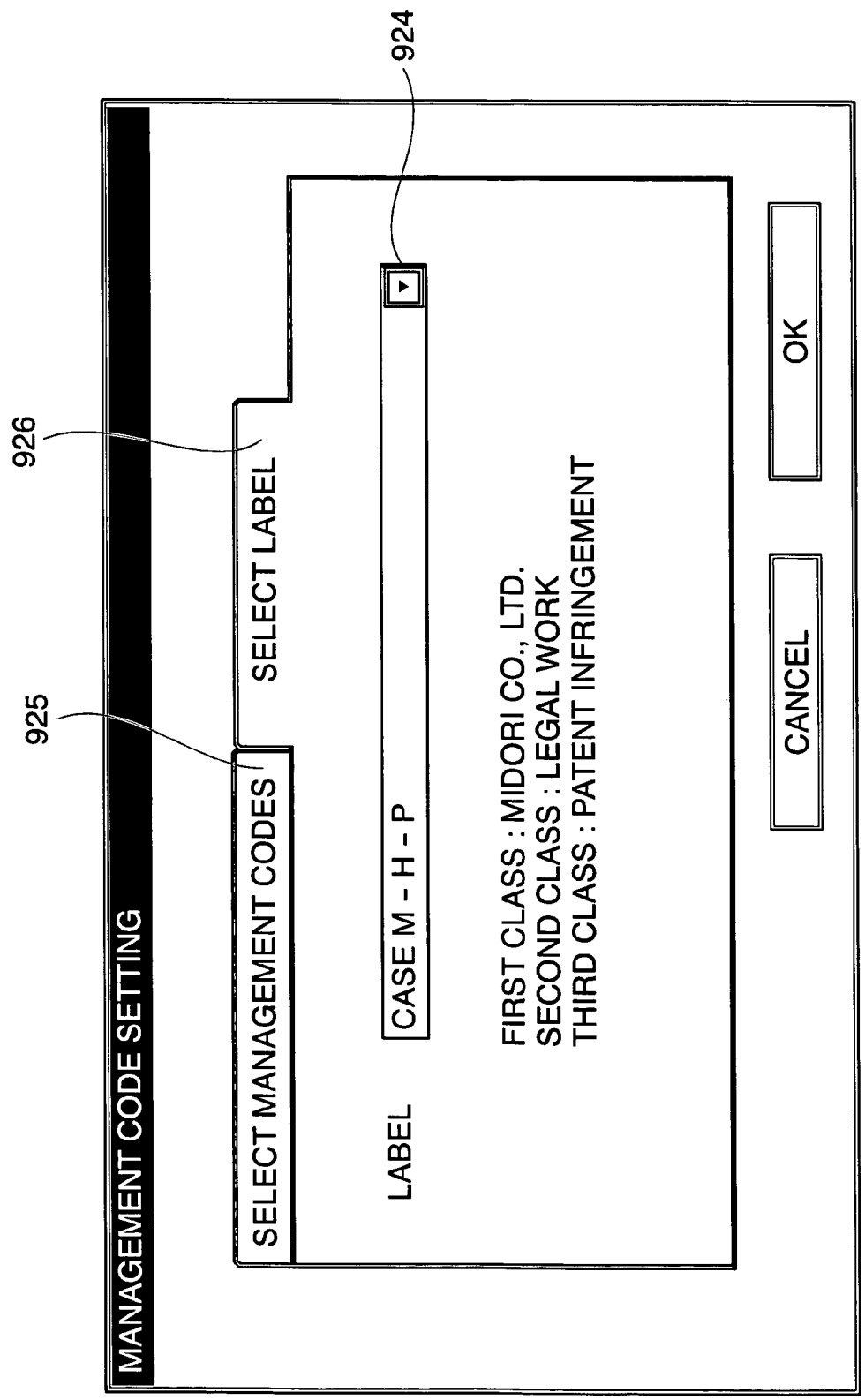

JOB INFORMATION MANAGING SYSTEM, JOB INFORMATION MANAGING METHOD, PROGRAM FOR IMPLEMENTING THE METHOD, AND STORAGE MEDIUM STORING THE PROGRAM

BACKGROUND OF THE INVENTION

1. Field of the Invention

The present invention relates to a job information managing system, a job information managing method, a program for implementing the method, and a storage medium storing the program.

2. Description of the Related Art

Conventionally, there has been developed a job information managing system comprised of an information processing apparatus which generates a job, an image processing apparatus which executes the job, and a job information managing apparatus which acquires and manages job information on the job executed by the image processing apparatus (refer to Japanese Laid-Open Patent Publication (Kokai) No. 2001-282475, for example).

In the job information managing system, the job information managing apparatus counts or totalizes the numbers of prints, sheet sizes, sheet types and so forth with respect to individual users based on acquired job information and displays the usage status with respect to individual users. Also, the job information managing apparatus defines properties such as "department" and "division", divides users into groups according to the properties, tabulates the usage status with respect to the individual properties, and displays the tabulation result in tabular or graphic form.

However, there may be a case where merely tabulating and displaying the usage status with respect to individual users or properties such as "department" and "division" to which the users belong are not almighty. For example, in a law firm in general, printing expenses are totalized with respect to individual services, and hence it is necessary to re-totalize printing expenses with respect to the individual services from the result of totalization of printing expenses with respect to individual users who have performed printing. Also, a user who has performed printing for a certain service does not always engage in the service, and hence even by referring to information on the user who has performed printing, it is difficult to determine which service corresponds to the printing. For this reason, properties called management codes are defined on a service-by-service basis so that usage status such as the number of prints, sheet size, and sheet type can be managed with respect to individual services.

However, in the above job information managing system which manages usage status using management codes, it is troublesome to manage and use management codes in the case where a large number of management codes are required. For example, in the case where hundreds of or thousands of management codes are defined, a desired management code must be selected from among the hundreds of or thousands of management codes so as to assign the management code to job information. Therefore, satisfactory user-friendliness cannot be realized.

SUMMARY OF THE INVENTION

It is an object of the present invention to provide a job information managing system and a job information managing method which can improve convenience in managing and using management codes and improve user-friendliness and convenience in printing management using the management codes, a program for implementing the method, and a storage medium storing the program.

To attain the above object, in a first aspect of the present invention, there is provided a job information managing system comprising at least one image processing apparatus, at least one information processing apparatus that generates a job for the image processing apparatus and generates job information on the job, and a job information managing apparatus that acquires the job information from the information processing apparatus and manages the job information, wherein the information processing apparatus comprises a creating device that creates an identifier in association with a plurality of management codes for managing the job information, and a sending device that sends the identifier created by the creating device to the job information managing apparatus, and wherein the job information managing apparatus comprises a storage device that stores the sent identifier in association with the plurality of management codes.

With the arrangement of the first aspect of the present invention, the information processing apparatus creates a label in association with a plurality of management codes for managing job information and sends the created label in association with the plurality of management codes to the job information managing apparatus, and the job information managing apparatus stores the sent label in association with the plurality of management codes. As a result, it is possible to improve convenience in managing and using management codes and to improve user-friendliness and convenience in printing management using the management codes.

Preferably, the information processing apparatus comprises a designating device responsive to input of the identifier or the management codes, to designate the plurality of management codes for the job information, and the sending device of the information processing apparatus sends the job information and the designated plurality of management codes to the job information managing apparatus, the storage device of the job information managing apparatus stores the job information and the designated plurality of management codes in association with each other, and the job information managing apparatus comprises a counting device that counts the job information with respect to each of the plurality of management codes.

Preferably, the management codes are used for counting system usage charges including charges for job processes including printing processes, usage rights for the management codes being settable for specific users so as to permit the users to count the system usage charges using the management codes.

Preferably, usage rights for the identifier can be set for specific users.

To attain the above object, in a second aspect of the present invention, there is provided a job information managing method of acquiring and managing job information on a job to be output from an information processing apparatus to an image processing apparatus, comprising a storing step of storing an identifier in association with a plurality of management codes for managing the job information.

To attain the above object, in a third aspect of the present invention, there is provided a job information managing program executable by a computer to acquire and manage job information on a job to be output from an information processing apparatus to an image processing apparatus, comprising a storing module for storing an identifier in association with a plurality of management codes for managing the job information.

Preferably, the job information managing program comprises a designating module for designating the plurality of management codes for the job information when the identifier or the plurality of management cods are input, and a second storing module for storing the job information and the designated plurality of management codes in association with each other, and a counting module for counting the job information with respect to each of the plurality of management codes.

Preferably, usage rights for the management codes can be set for specific users.

Preferably, usage rights for the identifier can be set for specific users.

To attain the above object, in a fourth aspect of the present invention, there is provided a storage medium storing a job information managing program according to any of claims 6 to 9.

To attain the above object, in a fifth aspect of the present invention, there is provided a job information managing apparatus that acquires job information on a job to be output from an information processing apparatus and manages the job information, comprising a storage device that stores an identifier in association with a plurality of management codes for managing the job information.

To attain the above object, in a sixth aspect of the present invention, there is provided an information processing apparatus that generates a job for an image processing apparatus, generates job information on the job, and sends the generated job information to a job information managing apparatus that manages the job information, comprising a creating device that creates an identifier in association with a plurality of management codes for managing the job information, and a sending device that sends the created identifier to the job information managing apparatus.

To attain the above object, in a seventh aspect of the present invention, there is provided a computer-executable program applied to a job information management system comprising a job information managing apparatus that counts job information by specifying counting units using a plurality of management codes, and at least one information processing apparatus connected to the job information managing apparatus, comprising an acquiring module for acquiring an identifier associated with the plurality of management codes stored in the job information managing apparatus, an updating module for updating the management codes with which the identifier acquired by the acquiring module is associated, and a transfer module for transferring the identifier updated by the updating module to store the identifier in the job information managing apparatus.

To attain the above object, in an eighth aspect of the present invention, there is provided a computer-executable program applied to a job information management system comprising a job information managing apparatus that counts job information by specifying counting units using a plurality of management codes, and at least one information processing apparatus connected to the job information managing apparatus, comprising a managing module for managing a plurality of management codes and an identifier used for counting of the job information in association with each other, and a display control module for displaying a selection screen for prompting determination as to whether the plurality of management codes managed by the managing module are to be designated or the identifier managed by the managing module is to be designated, when counting the job information.

Preferably, the display control module displays the selection screen in response to a printing instruction.

The above and other objects, features, and advantages of the invention will become more apparent from the following detailed description taken in conjunction with the accompanying drawings.

BRIEF DESCRIPTION OF THE DRAWINGS

FIG. 1 is a block diagram schematically showing the arrangement of a job information managing system according to an embodiment of the present invention;

FIG. 3 is a diagram showing the data structure of a hook log created by a hook module in FIG. 2A;

FIG. 4 is a diagram showing the data structure of a driver log created by a printer driver in FIG. 2A;

FIG. 5 is a diagram showing the data structure of an API log created by a spooler in FIG. 2A;

FIG. 6 is a diagram showing the data structure of a monitor log created by a transmission and reception module in FIG. 2A;

FIG. 7 is a diagram showing the data structure of a merge log created by a job log merge module in FIG. 2A;

FIG. 8 is a diagram showing the data structure of an apparatus log created by a printer in FIG. 2A;

FIG. 9 is a diagram showing the data structure of an apparatus log created by the printer in FIG. 2A;

FIG. 10 is a diagram showing the data structure of a final log created by a job log merge module in FIG. 2B;

FIG. 20 is a diagram showing the data structure of management codes registered in a step S503 in FIG. 19;

FIG. 21 is a diagram showing the data structure of labels registered in a step S505 in FIG. 19;

FIG. 38 is a view showing an example of a management code input dialogue displayed in a step S919 in FIG. 36.

DETAILED DESCRIPTION OF THE PREFERRED EMBODIMENTS

Figure 2A:
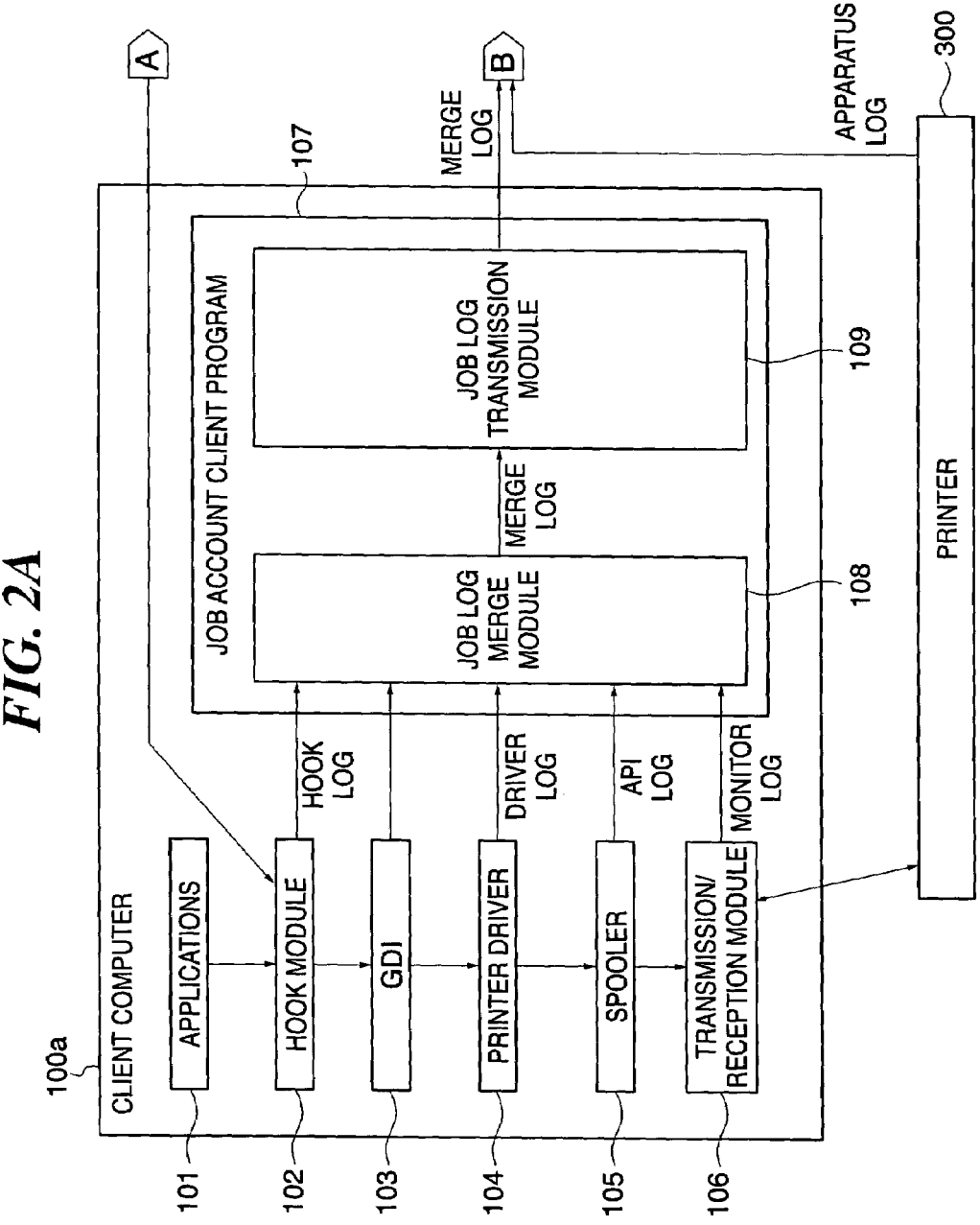
FIGS. 2A and 2B are block diagrams showing the software configuration of the job information managing system in FIG. 1.

The present invention will now be described in detail with reference to the drawings showing a preferred embodiment thereof.

FIG. 1 is a block diagram schematically showing the arrangement of a job information managing system according to an embodiment of the present invention.

The job information managing system in FIG. 1 is comprised of client computers 100a to 100c which are operated by users, a server computer 200 which manages components of the job information managing system, and image processing apparatuses implemented by printers 300a to 300c, a facsimile machine (FAX) 400, a copying machine 500, and a multi-function printer (MFP) 600. These components are connected to each other via a local area network (hereinafter simply referred to as "the network") 700 constructed based on e.g. Ethernet (registered trademark) such that they can communicate with each other.

It should be noted that there is no difference in hardware configuration between the client computers 100a to 100c and the server computer 200. The client computers 100a to 100c execute a job account client program, described later, and the server computer 200 executes a job account server program, described later. In the following description, the client computers 100a to 100c will be generically referred to as "client computer 100" unless otherwise specified.

Also, it should be noted that the server computer 200 is managed by an administrator, and hence users who use the client computer 100a and others do not have to be aware of the presence of the server computer 200.

It should be noted that the above-mentioned arrangement of the job information managing system is merely an example, and the present invention is not limited to this, insofar as the job information managing system according to the present embodiment is comprised of at least one client computer, at least one server computer, and at least one image processing apparatus. Although three client computers to be used by users are shown in FIG. 1, a plurality of other computers may be connected to the network 700, and they do not have to be connected to printers.

It should be noted that various kinds of image processing apparatuses can be envisaged as an image processing apparatus constituting the job information managing system; in the present embodiment, a description will be given of the printers 300a to 300c for example.

The printer 300a has a function of printing according to data received from the client computer 100, but does not have a function of outputting job information on a job executed by the printer 300a to an external apparatus.

The printer 300b has not only the above function of the printer 300a, but also a function of notifying job information such as the total number of discharged pages relating to a job to the client computer 100 upon completion of the job.

The printer 300c has a function of storing job information in an internal memory after printing, and outputting the job information in accordance with a request from the server computer 200.

The server computer 200 acquires job logs, described later, from the client computer 100 via the network 700, selects a specific job log in accordance with a request from a person who would like to review the job log, and carries out e.g. counting or totalization by unit time, device, user, and so forth.

Although in the present embodiment, it is assumed that TCP/IP is used as a protocol for the network 700, any other protocols may be used insofar as they can realize functions described below.

Figure 2B:
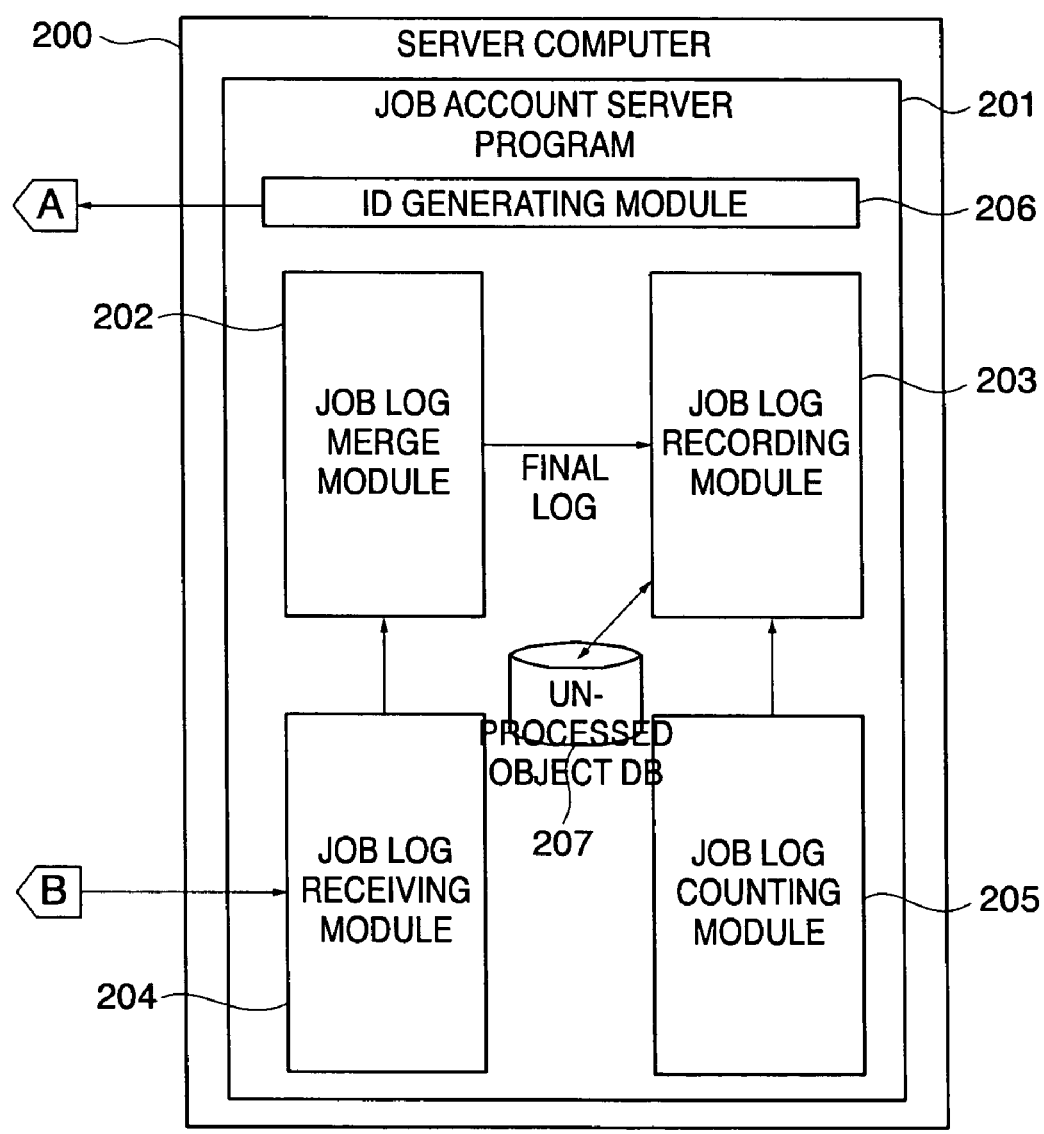

FIGS. 2A and 2B are block diagrams showing the software configuration of the job information managing system in FIG. 1.

As shown in FIG. 2A, the client computer 100 has an application 101, a hook module 102, a GDI 103, a printer driver 104, a spooler 105, a transmission/reception module 106, and a job account client program 107.

The application 101 operates on an operating system, not shown. The hook module 102 and the job account client program 107 are installed into the client computer 100. The GDI 103 is a sub-system included in the operating system, for performing graphic drawing.

The printer driver 104 is a program that is prepared by a printer manufacturer according to printers such as the printers 300a to 300c controlled by the client computer 100, for mediating between the printers 300a to 300c and the application 101. The spooler 105 is a temporary storage area reserved by the printer driver 104. The transmission/reception module 106 is included in the operating system. The job account client program 107 is executed by a CPU of the client computer 100.

The application 101 includes an image processing application which captures and processes images, a word processor application which creates document data, and so forth.

The job account client program 107 includes a job log merge module 108 and a job log sending module 109.

The job log merge module 108 collects various logs relating to various processing from the hook module 102, printer driver 104, spooler 105, and transmission/reception module 106. The job log sending module 109 transmits the logs, which have been collected by the job log merge module 108, as a merge log to a job account server program 201, described later.

The server computer 200 has a job account server program 201.

The job account server program 201 is comprised of a job receiving module 204, a job log merge module 202, a job log recording module 203, a job log counting module 205, a job ID generating module 206, an unprocessed object database (DB) 207. The functions of and relationship between these modules will be described later.

A description will now be given of the operation of the client computer 100.

In the client computer 100, when a printing instruction is issued to the application 101, the application 101 carries out GDI calls for drawing. The hook module 102 hooks (monitors and recognizes) the GDI calls and stores information such as what parameters were used for which GDI calls and the number of GDI calls. The hook module 102 counts e.g. APIs (Application Programming Interfaces), which carry out page feed or sheet discharge, to acquire information such as the number of sheets to be discharged or the number of pages in a job issued by the application 101, creates a hook log in FIG. 3 based on the information, and sends the hook log to the job account client program 107.

The hook module 102 can change document names according to predetermined criteria. A description of document names and a process for changing them will be given later.

As shown in FIG. 3, the hook log includes a job ID, an application name, the number of logical pages, a document name, and so forth. The job ID is an identifier which is acquired from the GDI 103 upon a GDI call and uniquely designates a print job.

Referring again to FIG. 2A, the printer driver 104 converts the GDI call into print data which can be interpreted by a printer according to print settings, and sends the print data to the spooler 105. Also, the printer driver 104 creates a driver log in FIG. 4 based on information extracted from the print data obtained by the conversion and sends the driver log to the job account client program 107.

As shown in FIG. 4, the driver log includes the job ID, the sheet size of print data included in the job, N-up information, information indicative of the number of physical pages, information indicative of double-sided/one-sided printing, and so forth. The sheet size, N-up information, number of physical pages, and double-sided/one-sided printing information are acquired from print settings made in the printer driver 104 during printing. The N-up information is indicative of the number of logical pages allotted to one sheet. The number of physical pages means the number of pages in the case where one side of a sheet to be output in printing is counted as 1.

Taking an example where the number of logical pages is 4 and the N-up information is indicative of 2, the number of physical pages is 2. When the physical pages are printed on both sides of a sheet, one sheet is output and discharged. That is, the first and second pages of the logical pages are printed on one side of a sheet and the third and fourth pages of logical pages are printed on the reverse side of the sheet.

Referring again to FIG. 2A, the job account client program 107 periodically monitors the spooler 105; when there is a job spooled by the spooler 105, information indicative of the number of sheets to be discharged or the number of pages in the job is acquired via an API (Application Program Interface) of the OS, and an API log in FIG. 5 is created based on the information and sent to the job account client program 107.

As shown in FIG. 5, the API log is comprised of the job ID, the owner's name of the job (user name), and a spool data size.

Referring again to FIG. 2A, the transmission/reception module 106 communicates with one of the printers 300a to 300c, which is designated by the application 101, and sends the print data to the printer if the printer is ready to receive the print data. On this occasion, by using e.g. a command according to Printer Job Language (registered trademark) produced by Hewlett-Packard Co., it is possible to acquire the number of pages discharged in the job after the printer 300b completes discharge of all the pages in the job. The transmission/reception module 106 creates a monitor log in FIG. 6 based on job information such as the number of pages received from the printer 300b and sends the monitor log to the job account client program 107.

As shown in FIG. 6, the monitor log includes the job ID. In the case where print data is sent to the printer 300b, the monitor log further includes the number of discharged pages and the number of discharged sheets, not shown.

In each of the hook log, the driver log, the API log, and the monitor log, there is provided an area where flag information indicative of whether the concerned job has already been processed or not and information indicative of a log type.

The job log merge module 108 merges the hook log, the driver log, the API log, and the monitor log; normally, the job log merge module 108 sends a merge log in FIG. 7 to the job log sending module 109 each time a merging process is completed.

As shown in FIG. 7, the merge log is comprised of the items included in the hook log, the driver log, the API log, and the monitor log.

It should be noted that the job log sending module 109 sends a merge log to the job log receiving module 204 periodically or in response to a request from the job log receiving module 204. On this occasion, the job log sending module 109 may control the transmission/reception module 106 provided by the OS so that the merge log can be sent to the job log receiving module 204. It should be noted that the job account client program 107 may allot priorities to the hook log, the driver log, the API log, and the monitor log, and send any of these logs to the job account server program 201 according to the priorities.

A description will now be given of the operation of the server computer 200.

The job log receiving module 204 acquires the merge log sent from the job log sending module 109 and stores the same. Also, in the case where a printer which executes a job has a function of storing job information, that is, it is the printer 300c, the job log receiving module 204 defines a protocol for communication with the printer 300c and communicates with the same so as to acquire job information as an apparatus log directly from the printer 300c. Specifically, the job log receiving module 204 periodically polls the printer 300c, and if there is any information which has not been acquired yet, the job log receiving module 204 acquires the job information as an apparatus log shown in FIGS. 8 and 9. The apparatus log is stored in a RAM or a HD of the printer 300c. Because of the limited storage capacity of the RAM or the HD, it is not desirable that all the pieces of information such as a document name sent from the transmission/reception module 106 to a printer are stored as the apparatus log.

FIG. 8 is a diagram showing an example of the apparatus log in the case where a job is sent from a client computer on which the hook module 102 operates to the printer 300c. FIG. 9 is a diagram showing an example of the apparatus log in the case where a job is sent from a client computer on which the hook module 102 does not operate to the printer 300c.

The job log merge module 202 merges the merge log in FIG. 7 and the apparatus log in FIG. 8 sent from the job account client program 107 to generate a final log in FIG. 10. As shown in FIG. 10, the final log is comprised of the items included in the merge log and the apparatus log.

The job log recording module 203 receives the final log from the job log merge module 202 and refers to the unprocessed object DB 207. If the received final log is subjected to processing, the job log recording module 203 stores the received final log in e.g. a HD of the server computer 200. The job log counting module 205 is responsive to an instruction from a person who reviews, to carry out counting of the number of print pages per unit time, the number of print pages for each owner, and so forth.

The ID generating module 206 issues a client ID for uniquely identifying the client computer 100. The client ID is set as a four-digit character string (aaaa, aaab, . . . , zzzy, and zzzz) each digit of which may assume 26 values, i.e. a to z in accordance with a request from the hook module 102. Here, a new document name is created using a combination of a client ID and a job ID, but the job account server program 201 may issue a new unified document name unique to the entire system.

Although in the present embodiment, it is assumed that in the client computer 100, four logs, i.e. the hook log, the driver log, the API log, and the monitor log are created for one print job, these four logs should not necessarily be created. For example, if the application 101 directly sends print data to the spooler 105, the hook log and the driver log are not created. If no protocol is prescribed for communication between the printer driver 104 and the job account client program 107, the job account client program 107 cannot acquire the driver log. If a printer which executes a job does not have the function of notifying the number of discharged pages to the transmission/reception module 106 as is the case with the printer 300a, the transmission/reception module 106 cannot acquire information on the number of discharged pages in the monitor log.

In the present embodiment, logs are acquired in a plurality of processes relating to a print job, and therefore, even if it is impossible to acquire logs in part of the processes, logs can be finally acquired with a high probability.

In the job information managing system constructed as described above, whether logs as job information acquired from the client computer 100, the printer 300, and so forth should be recorded or not is determined according to the process of generation of the logs and only logs which should be recorded are recorded in the server computer 200.

A description will now be given of the hardware configuration of the computers in the job information managing system according to the embodiment of the present invention.

Figure 11:
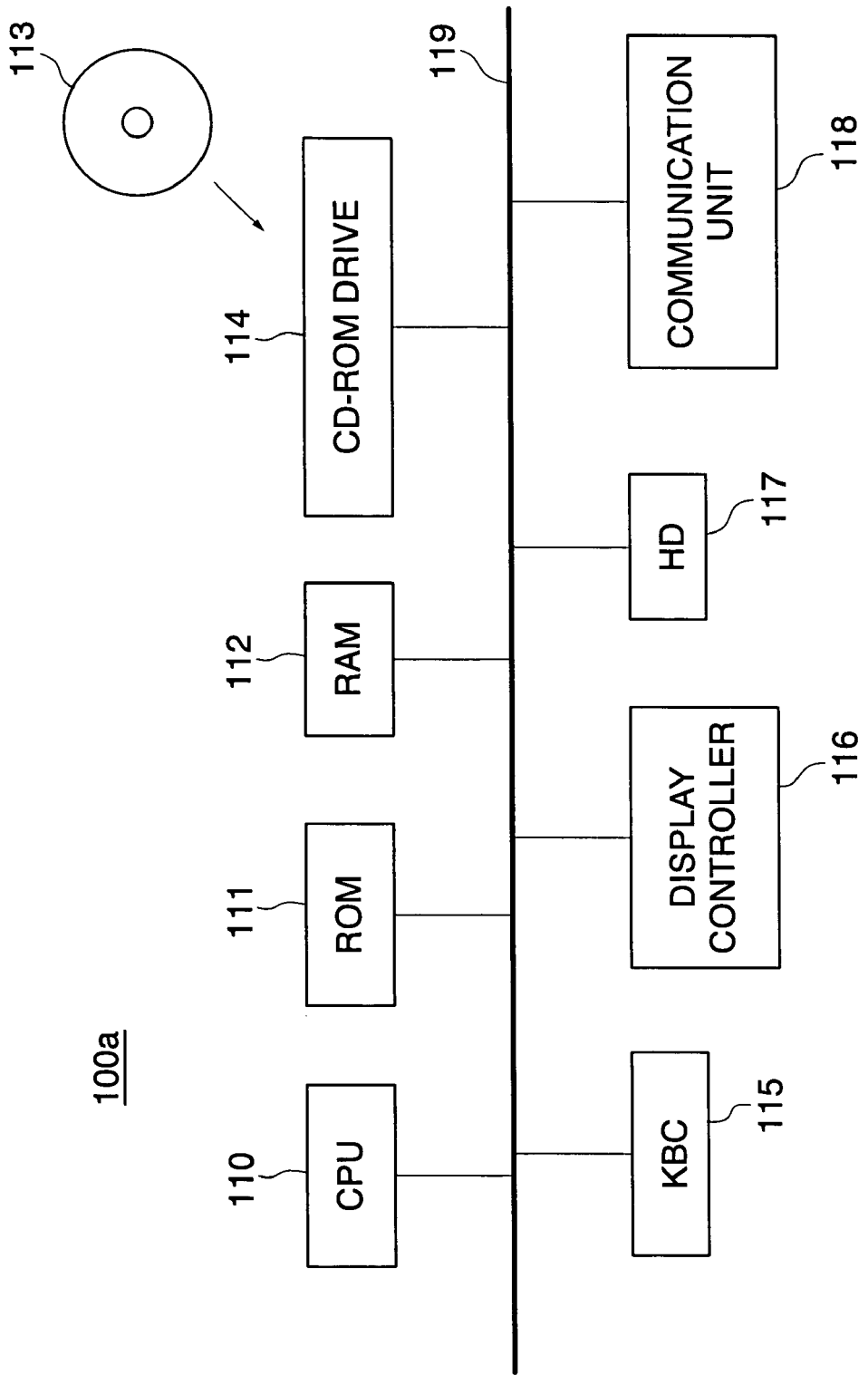
FIG. 11 is a block diagram showing the hardware configuration of a client computer in FIG. 1.

FIG. 11 is a block diagram showing the hardware configuration of the client computer 100 in FIG. 1.

The client computer 100 in FIG. 11 is comprised of a CPU (Central Processing Unit) 110, a ROM (Read Only Memory) 111, a RAM (Random Access Memory) 112, a CD-ROM drive 114 for reading a CD-ROM 113, a KBC (Keyboard Controller) 115, a display controller 116, a HD (Hard Disk) 117, and a communication unit 118, which are connected to each other via a system bus 119.

The CPU 110 controls the overall operation of the client computer 100 and carries out computations and others. The ROM 111 is a storage area which stores e.g. information on a system starting program. The RAM 112 is a data storage area on which no usage restrictions are imposed. The KBC 115 sends data input from a keyboard, not shown, to the CPU 110. The display controller 116 controls display on a CRT, a liquid crystal display, or the like. The HD 117 stores programs and data, and refers to or loads the programs and the data into the RAM 112 as the need arises during execution of programs. The communication unit 118 is used for communication with other computers and image processing apparatuses connected to the network 700.

The communication unit 118 is controlled by the transmission/reception module 106, the job log sending module 109, and so forth in FIG. 2A.

Software modules such as the application 101, hook module 102, GDI 103, printer driver 104, transmission/reception module 106, and job account client program 107 in FIG. 2A,
the operating system, communication control programs, and so forth are loaded from the HD 117 and the ROM 111 into the RAM 112 and executed by the CPU 110.

It should be noted that in place of or in addition to the HD 117, another storage device such as a nonvolatile memory may be provided.

The server computer 200 is basically identical in construction with the client computer 100, and therefore component elements of the server computer 200 are designated by reference numerals 210 to 219, not shown, with hundreds digits thereof being 2 and last two digits corresponding to those of the reference numerals 110 to 119 designating the component elements of the client computer 100 in FIG. 11. Specifically, the server computer 200 is comprised of a CPU 210, a ROM 211, a RAM 212, a CD-ROM drive 214 for reading a CD-ROM 213, a KBC 215, a display controller 216, a HD 217, and a communication unit 218, which are connected to each other via a system bus 219.

The computers of the printers 300a to 300c are identical in hardware configuration, and therefore a description will now be given of the printer 300a for example.

Figure 12:
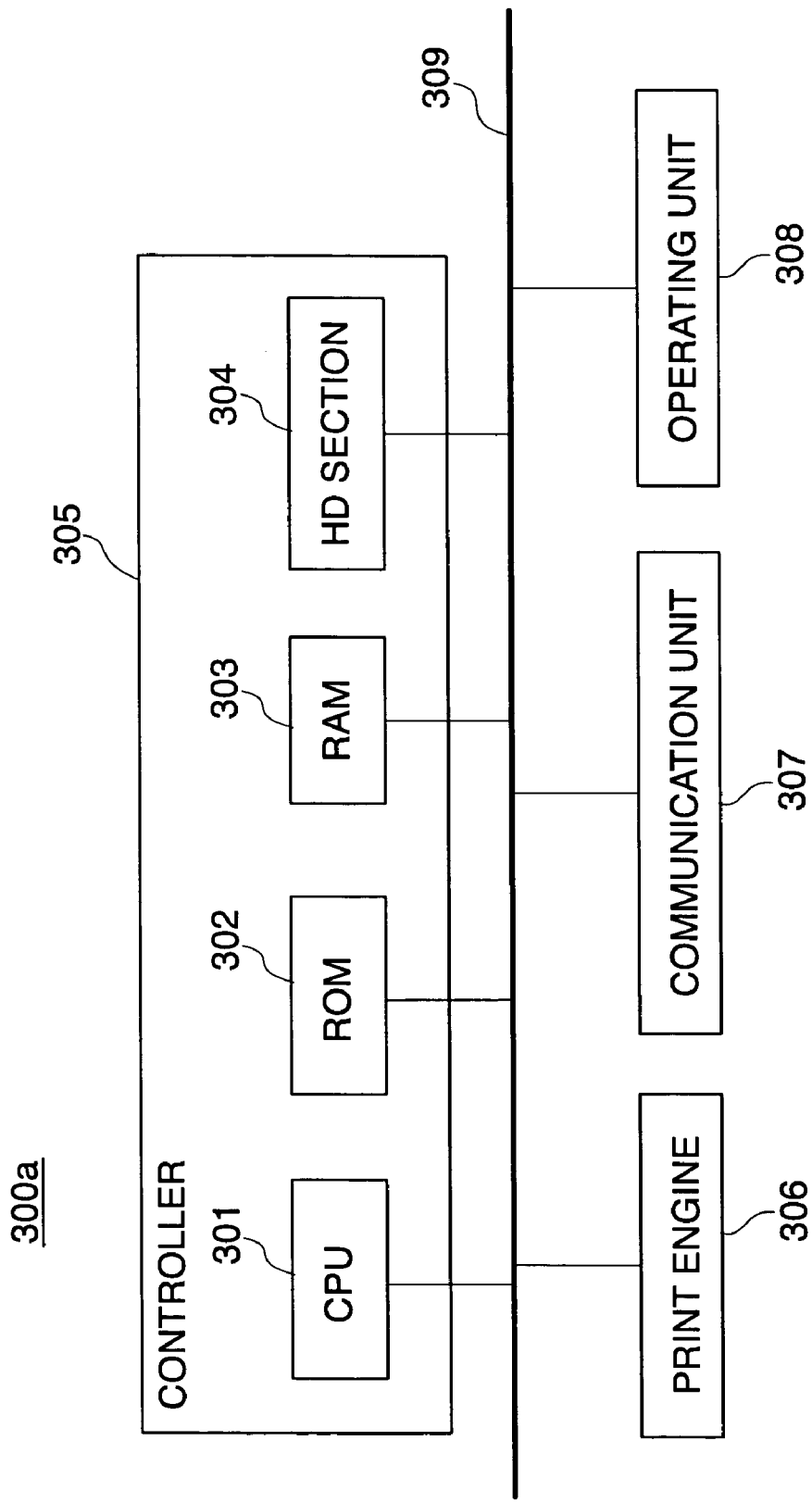
FIG. 12 is a block diagram showing the hardware configuration of a printer in FIG. 1.

FIG. 12 is a block diagram showing the hardware configuration of the printer 300a in FIG. 1.

The printer 300a in FIG. 12 has a controller 305, a print engine 306, a communication unit 307, and an operation unit 308.

The controller 305 controls the entire printer 300a. The print engine 306 carries out a printing operation and an image reading operation under the control of the controller 305. The communication unit 307 communicates with the client computers 100a to 100c and the server computer 200. The operation unit 308 carries out a setting operation interactively with a user.

The controller 305 is comprised of a CPU (Central Processing Unit) 301, a ROM (Read Only Memory) 302, a RAM (Random Access Memory) 303, a HD (Hard Disk) 305, which are connected to each other via a system bus 309.

The CPU 301 controls the overall operation of the printer 300 and carries out e.g. computations. The ROM 302 includes a data storage area upon which no usage restrictions are imposed. The HD 304 includes a storage area which reserves programs and data, which may be rewritable, even after power supply to the printer 300a is turned off.

The RAM 303 includes a storage area in which an operating system and programs for communication control, engine control, and so forth are loaded and executed.

Figure 13:
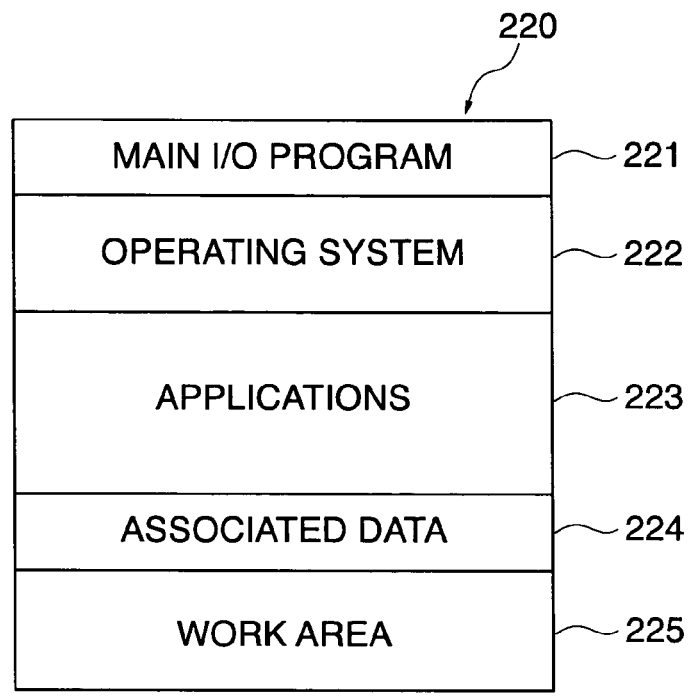
FIG. 13 is a diagram showing a memory map in a RAM of a server computer in FIG. 1.

FIG. 13 is a diagram showing a memory map 220 in the RAM 212 of the server computer 200 in FIG. 1.

As shown in FIG. 13, in the server computer 200, a main I/O program 221, an operating system 222, and applications 223 are loaded into the RAM 212 so that they can be executed. In the RAM 212 of the server computer 200, associated data 224 generated by execution of the applications 223 is additionally stored, and a working area 225 for operation of other programs is also prepared.

The software configuration of the server computer 200 as shown in FIG. 2B can be realized by externally installing the job account server program 201. The job account server program 201 can be downloaded via a network such as the Internet, or installed from a portable and removable storage medium.

Figure 14:
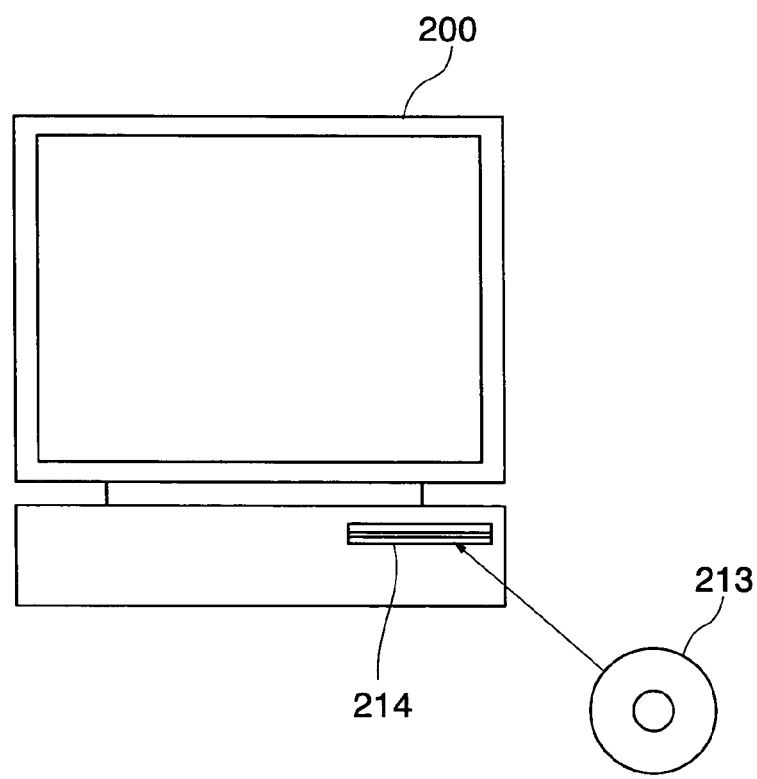
FIG. 14 is a diagram useful in explaining a method of installing a job account server program in FIG. 2B into the server computer.
Figure 15:
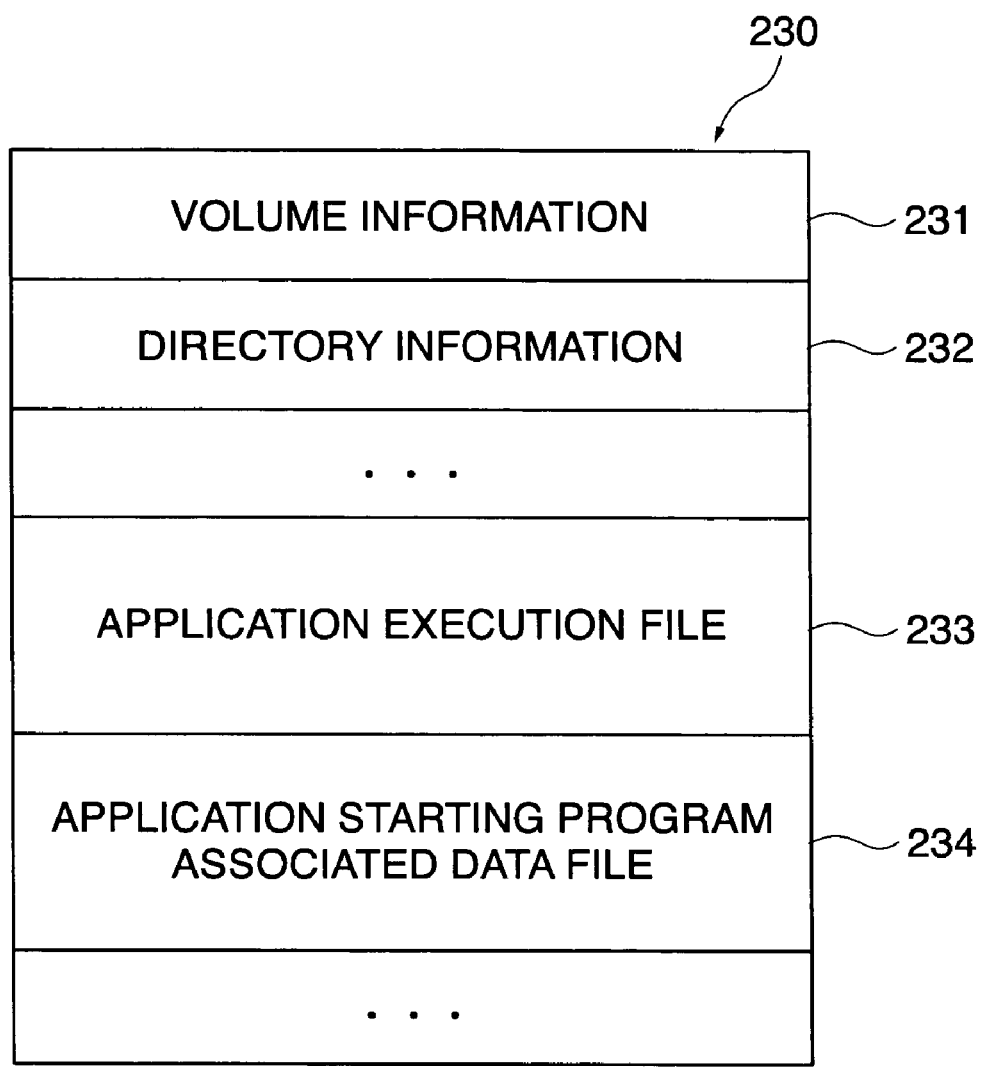
FIG. 15 is a diagram showing a memory map of a storage area in a CD-ROM in FIG. 14.

For example, as shown in FIG. 14, the job account server program 201 is installed by causing the CD-ROM drive 214 of the server computer 200 to read information on the CD-ROM 213. In this case, as shown in FIG. 15, volume information 231, directory information 232, an execution file 233, and an associated data file 234 are recorded in a storage area 230 of the CD-ROM 213. The execution file 233 includes an install program for the job account server program 201.

When the CD-ROM 213 is set in the CD-ROM drive 214, the execution file 233 is executed under the control of the operating system 222 and the main I/O program 221, and e.g. program modules and associated data for realizing the job account server program 201 are read out from the CD-ROM 213 and stored in the HD 217. The program modules for realizing the job account server program 201 include the modules 202 to 207 in FIG. 2B.

It goes without saying that the storage medium should not be limited to a CD-ROM, but may be a DVD, a FD, or the like.

Figure 16:
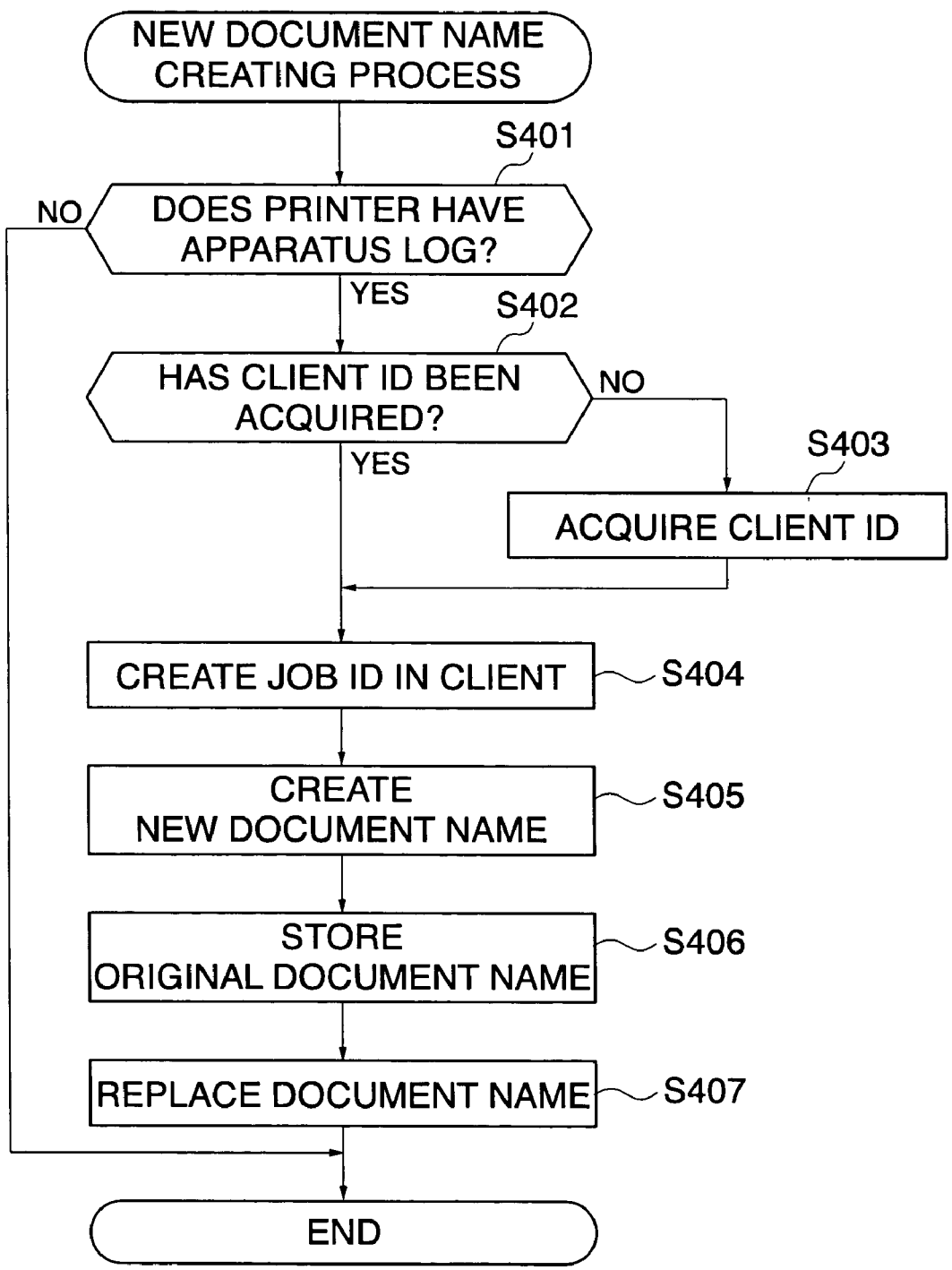
FIG. 16 is a flow chart showing a new document name creating process executed by the hook module in FIG. 2A.

FIG. 16 is a flow chart showing a new document name creating process executed by the hook module 102 in FIG. 2A.

As shown in FIG. 16, according to a predetermined apparatus management protocol, the hook module 102 determines whether or not the printer 300a has an apparatus log by referring to information acquired from the printer 300a which is to perform printing (step S401). If the printer 300a does not have an apparatus log, the process is immediately terminated. On the other hand, if the printer 300a has an apparatus log, the hook module 102 determines whether or not a client ID as identification information, which is issued by the ID generating module 206 so as to enable the client computer 100 to be uniquely identified, has been acquired from the ID generating module 206 (step S402).

If it is determined in the step S402 that the hook module 102 has not yet acquired the client ID, the hook module 102 communicates with the ID generating module 206 to acquire the client ID from the ID generating module 206 (step S403), and the process proceeds to a step S404. On the other hand, if the hook module 102 has already acquired the client ID, the process proceeds to the step S404 without executing the step S403.

In the step S404, an in-client computer job ID which uniquely identifies a job within a client computer is created. It is assumed here that numerals 0001 to 9999 are sequentially issued.

Then, the hook module 102 combines the client ID acquired from the ID generating module 206 with the created in-client computer job ID to create a new document name as new identification information which is uniquely defined within the job information managing system (step S405). The hook module 102 stores the original document name, which has been sent from the application 101, in an item "original document name" in the hook log (step S406), and replaces the document name by the new document name (step S407) and terminates the process.

As a result, the new document name is sent to the GDI 103, and subsequent processing is performed by the printer driver 104, spooler 105, transmission/reception module 106, and printer 300a using the new document name.

The reason why the new document name is created is that in merging job information acquired from a printer, it is difficult to use a job ID as it is as a key for merging. For example, since part of the specifications of a job information managing process is not publicly known, in many cases, a server computer A developed by a company A cannot acquires a job ID from a printer B developed by a company B. Specifically, in many cases, no job ID is not included in job information acquired from a printer which is not adapted to an unexpected job information managing process, and hence the job information cannot be merged for use. However, in many cases, a document name which is created by an OS or applications of a client computer and sent to a printer can be acquired as job information.

Therefore, it can be envisaged that a document name which can be managed by a client computer and acquired as a job information key from a printer in place of a job ID is used as identification information. However, using the conventional document name as it is raises a problem. In general, a document name which can be managed by an OS or an application of a client computer is comprised of nine or more characters, and according to an OS which is ordinarily used, a document name comprised of up to 255 characters may be given, but a printer can manage a document name comprised of eight or less characters, and a document name which can be used in a job information managing process is usually comprised of eight or less characters. For this reason, there may be a case where different document names comprised of eight or more characters given by an OS or an application of a client computer are regarded as the same document name comprised of eight characters in a printer, which is very confusing.

To solve this problem, a client ID issued by a server computer and a job ID issued by a client computer are combined to be used as a document name. As a result, a new document name comprised of eight characters uniquely defined in a system which is managed by a server computer and is comprised of client computers and printers is created to be used for identification of a job in place of a job ID. Once a new document name has been created in a client computer, this new document name can be used as a job identifier in printers, client computers, and server computer.

A description will now be given of the operation of the job log merge module 108 of the client computer 100.

Figure 17:
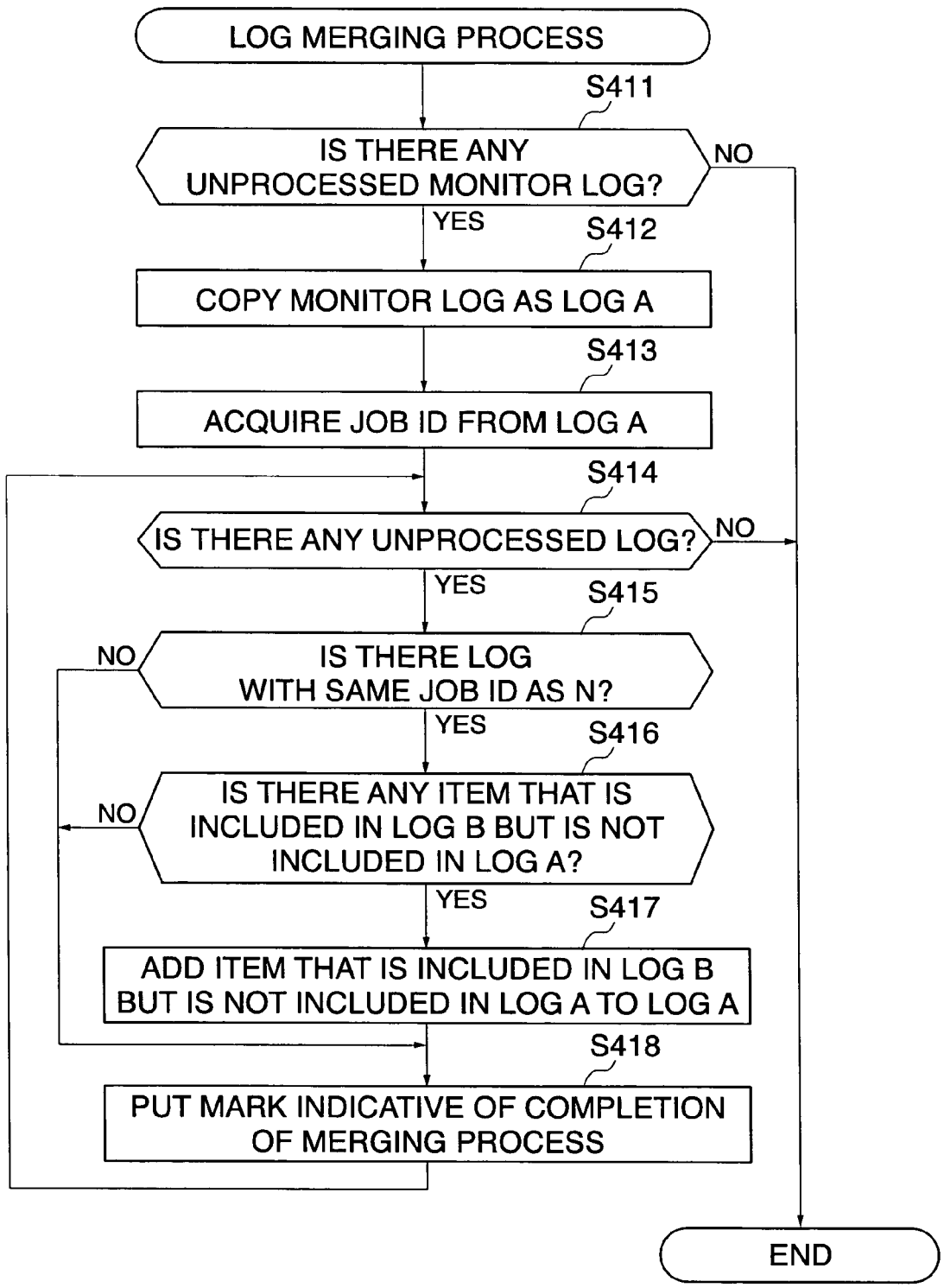
FIG. 17 is a flow chart showing a log merge process executed by the job log merge module in FIG. 2A.

FIG. 17 is a flow chart showing a log merging process executed by the job log merge module 108 in FIG. 2A.

The log merge module 108 receives logs such as a hook log, driver log, API log, and monitor log, records contents thereof in e.g. the HD 117, and executes the present process at predetermined regular time intervals to carry out merging for each job to create a merge log.

As shown in FIG. 17, the job log merge module 108 determines whether or not there is any monitor log with a processed flag thereof not being YES, i.e. any monitor log which has not yet been processed (step S411). If there is no unprocessed monitor log, the process is immediately terminated, and on the other hand, if there is any unprocessed monitor log, the process proceeds to a step S412.

In the step S412, the unprocessed monitor log is copied to another temporary storage area and assumed as a log A, and a job ID is acquired from the log A (step S413).

Then, search is carried out for a hook log, a driver log, and an API log corresponding to the acquired job ID to determine whether or not there is any log which has not been subjected to merging, i.e. whether or not there is any unprocessed log (step S414). If there is no unprocessed log, the process is terminated, and if there is any unprocessed log, the process proceeds to a step S415.

In the step S415, a log which has the same job ID as a job ID (referred to as "N" for the convenience of explanation) of the unprocessed log is searched for through the hook log, the driver log, and the API log to determine whether there is any log having the same job ID as N. If there are a plurality of unprocessed logs, job IDs in the unprocessed logs A are sequentially identified as N in order from the smallest one.

If it is determined in the step S415 that there is no log which has the same job ID as N, an item "type" in the unprocessed log A is set as "merge" to make a mark indicating that merging has been completed (step S418), and then the step S414 and the subsequent steps are executed again.

If it is determined in the step S415 that there is a log which has the same job ID as N, this log is assumed as a log B, and it is determined whether or not there is any item that is included in the log B but is not included in the log A (step S416). If there is no item that is included in the log B but is not included in the log A, an item "type" in the log A is set as "merge" to make a mark indicating that merging has been completed (step S418), and the step S414 and the subsequent steps are executed again.

If it is determined in the step S416 that there is any item which is included in the log B but is not included in the log A, this item is added to the log A to create a merge log (step S417), and a processed flag of the merge log is set to "YES" to make a mark indicating that merging has been completed (step S418). Then, the step S414 and the subsequent steps are executed again.

In the present process, the job log merge module 108 identifies the earliest start time and the latest finish time among start times and finish times indicated by entries of start time information and finish time information included in each of the hook log, driver log, API log, and monitor log, and merges and stores them as a merge log.

In the present process, logs are merged using a job ID as a key, but a document data name or a new document data name may be used as the key.

Figure 18:
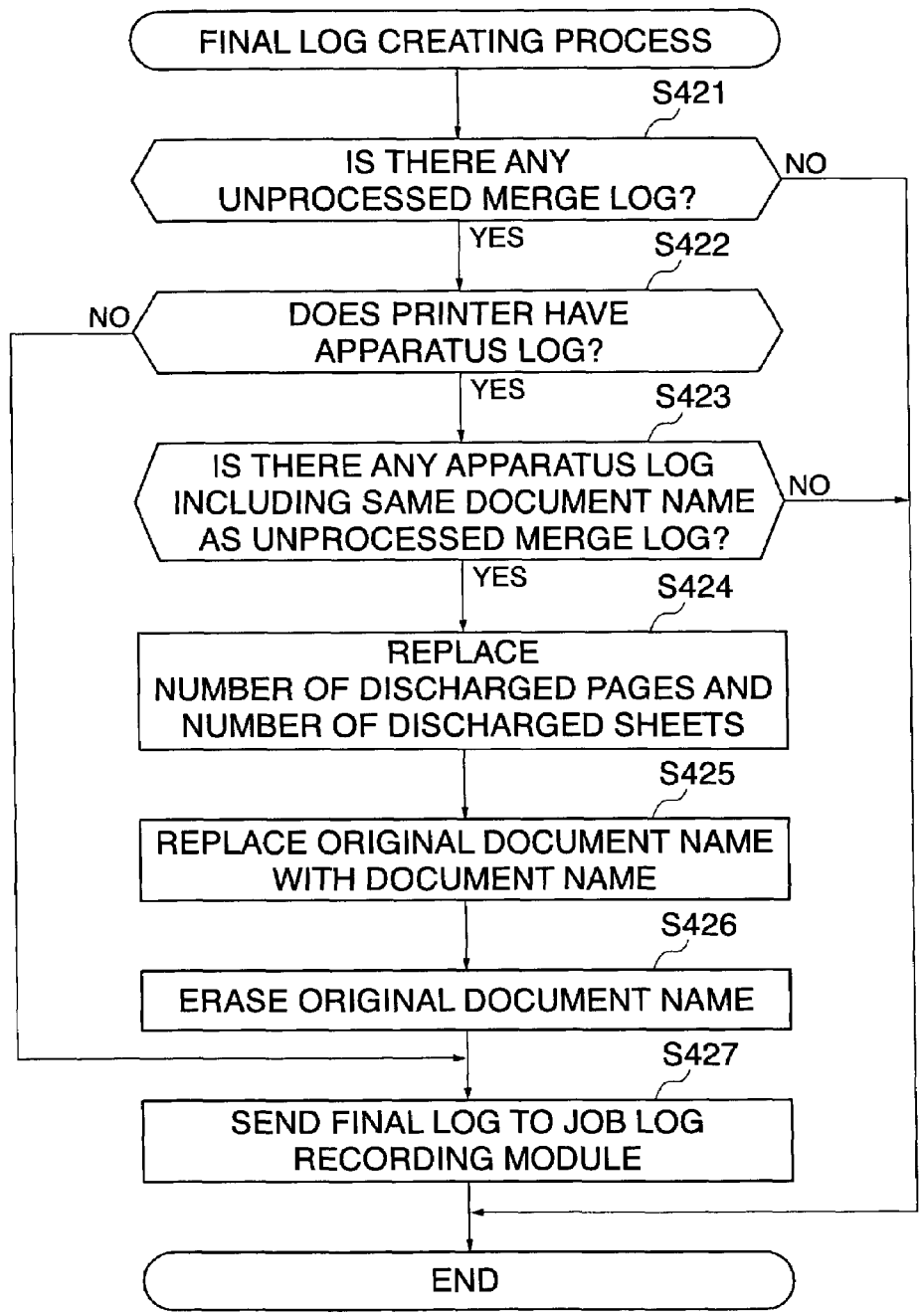
FIG. 18 is a flow chart showing a final log creating process executed by the job log merge module in FIG. 2B.

FIG. 18 is a flow chart showing a final log creating process executed by the job log merge module 202 in FIG. 2B.

As shown in FIG. 18, the job log merge module 202 determines whether or not there is any unprocessed merge log (step S421). If there is any unprocessed merge log, it is determined whether or not the printer has an apparatus log (step S422). If the printer has an apparatus log, it is determined whether there is an apparatus log including the same document name as in the unprocessed merge log (step S423).

If it is determined in the step S423 that there is an apparatus log including the same document name as in the unprocessed merge log, the number of discharged pages and the number of discharged sheets in the apparatus log are caused to overwrite the merge log, or are added to the merge log (step S424), and the original document name is replaced by the document name (step S425); for example, "document name: 2001 annual report, original document name: abcd0001" as shown in FIG. 7.

Then, the original document name in the merge log is erased to be a final log (step S426), and the final log is sent to the job log recording module 203 (step S427), followed by termination of the process.

If it is determined in the step S421 that there is no unprocessed merge log, or if it is determined in the step S423 that there is no apparatus log including the same document name as in the unprocessed merge log, the process is immediately terminated.

If it is determined in the step S422 that the printer has no apparatus log, the step S427 is executed to terminate the process.

Figure 19:
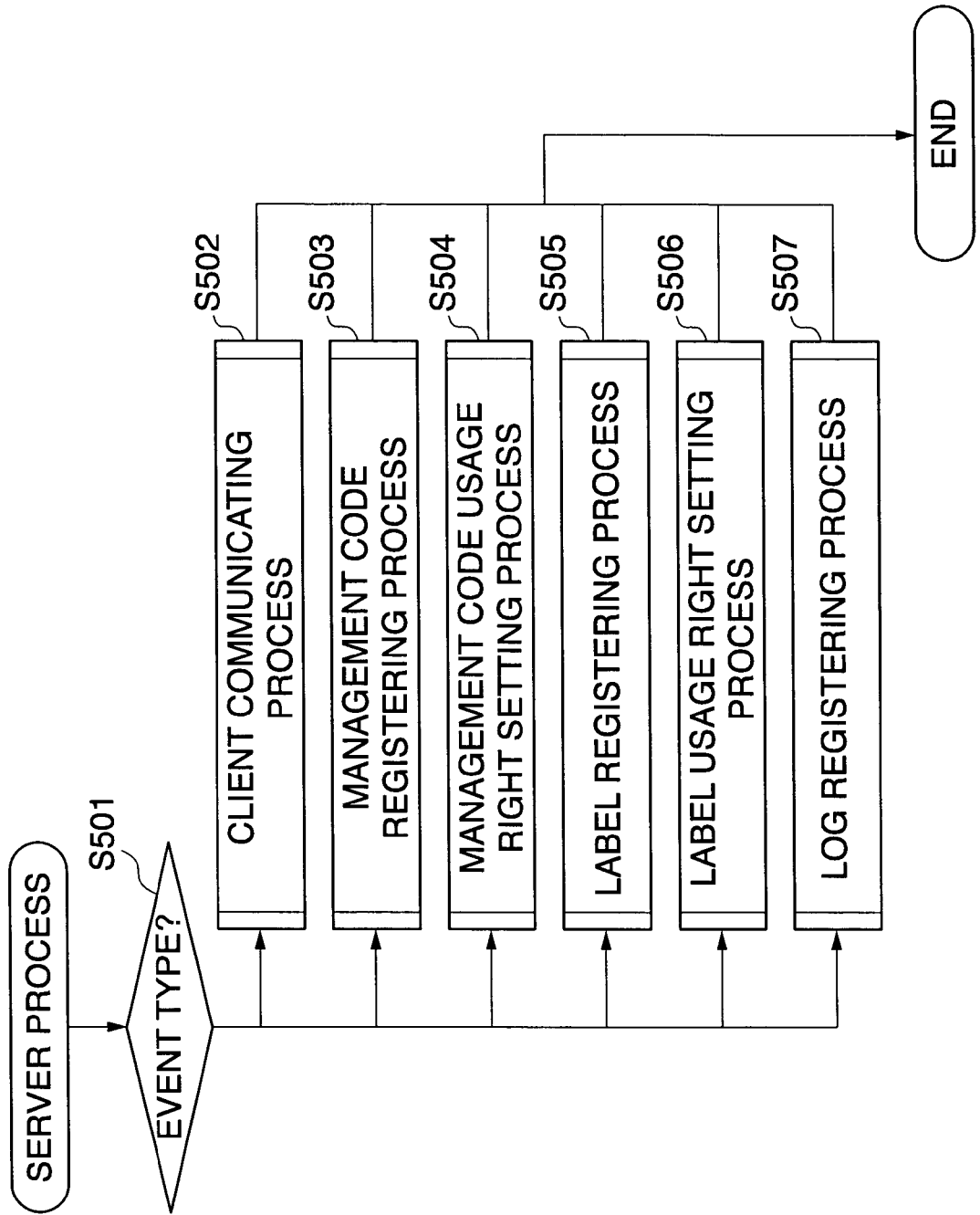
FIG. 19 is a flow chart showing a main process executed by the server computer in FIG. 2B.

FIG. 19 is a flow chart showing a main process carried out by the server computer 200 in FIG. 2B.

As shown in FIG. 19, the server computer 200 checks the type of an event that has occurred (step S501), and carries out a client communicating process (step S502), a management code registering process (step S503), a management code usage right setting process (step S504), a label registering process (step S505), a label usage right setting process (step S506), or a process for registering the above-mentioned job information (step S507) according to the type of the event and terminates the process.

Figure 22:
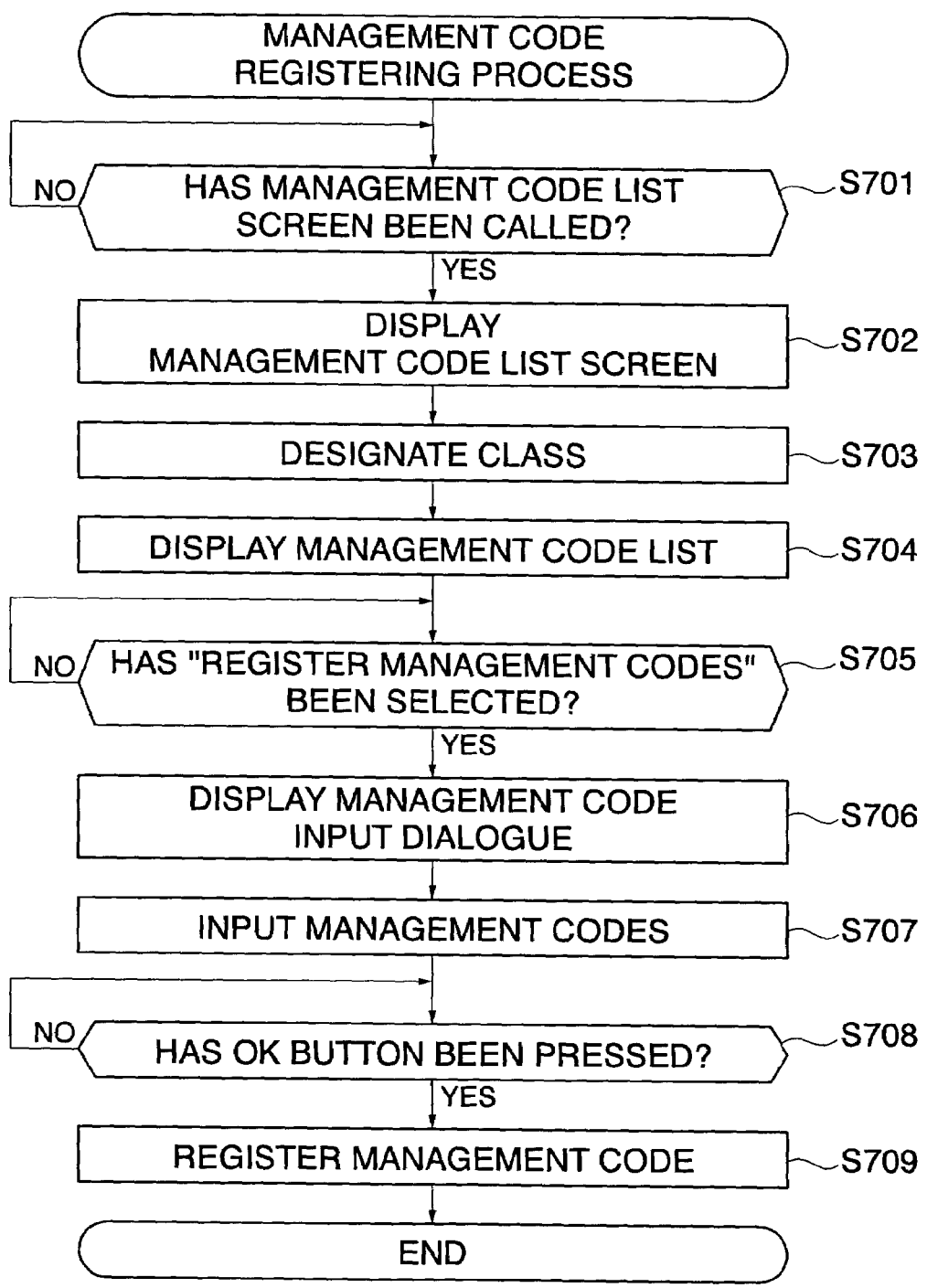
FIG. 22 is a flow chart showing a management code registering process in the step S503 in FIG. 19.
Figure 25:
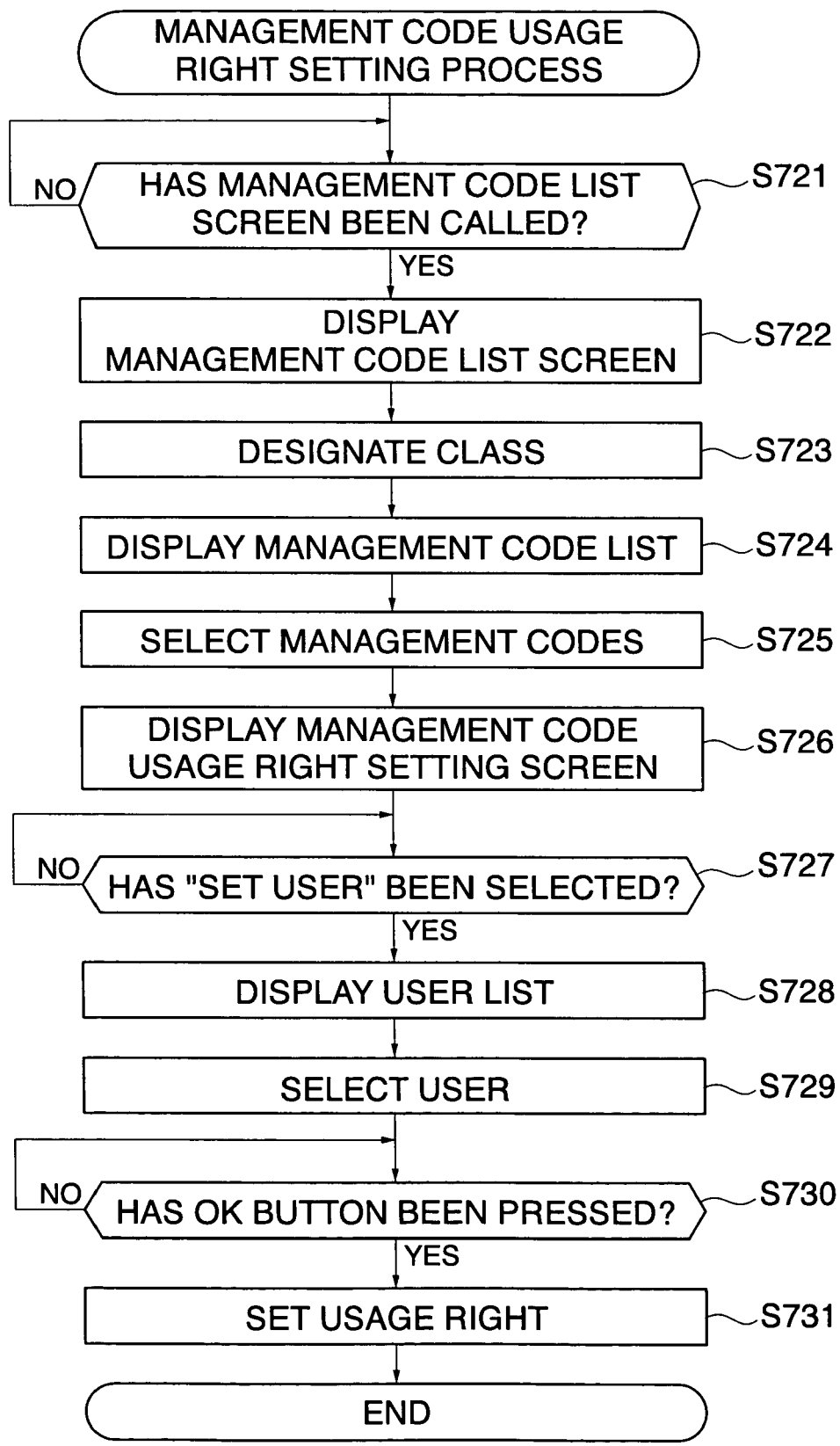
FIG. 25 is a flow chart showing a management code usage right setting process in a step S504 in FIG. 19.
Figure 28:
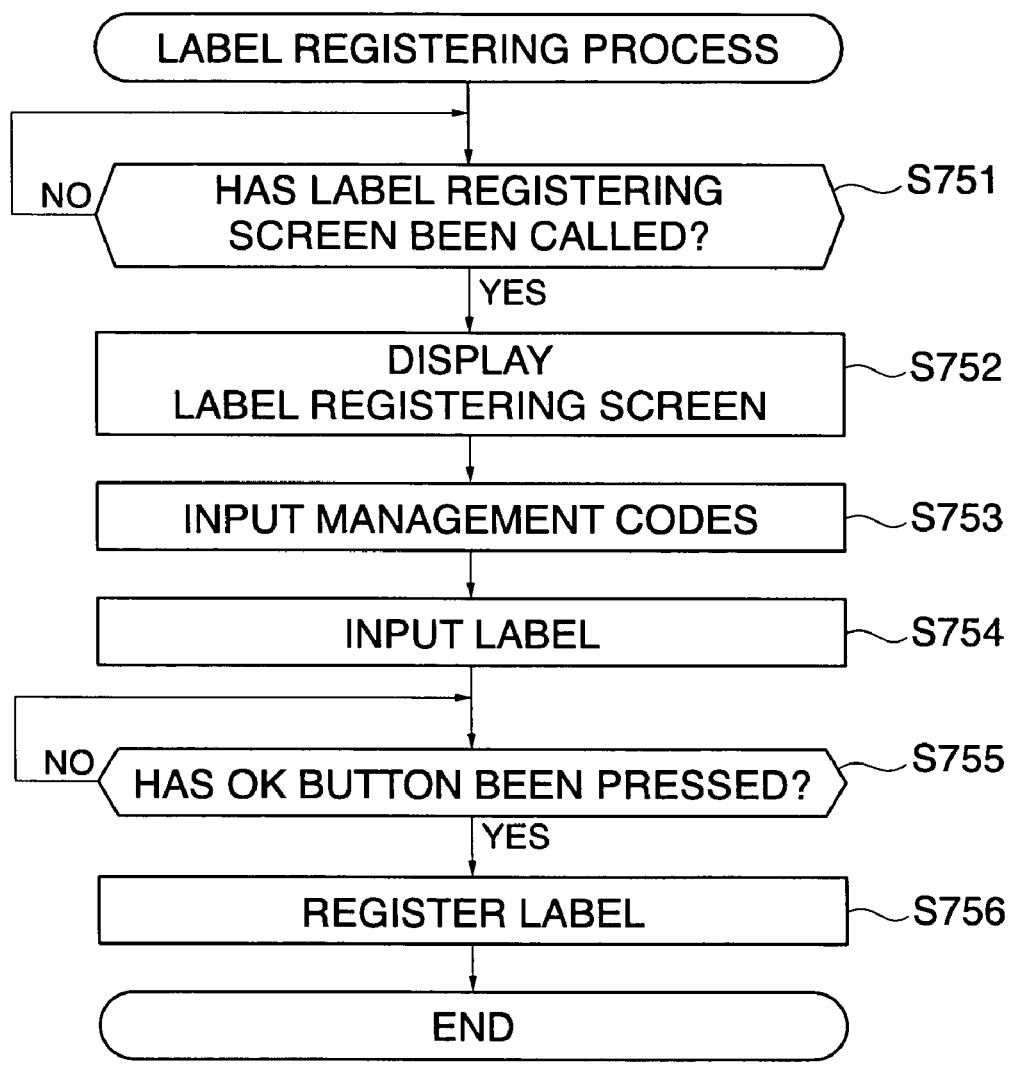
FIG. 28 is a flow chart showing a label registering process in the step S505 in FIG. 19.
Figure 30:
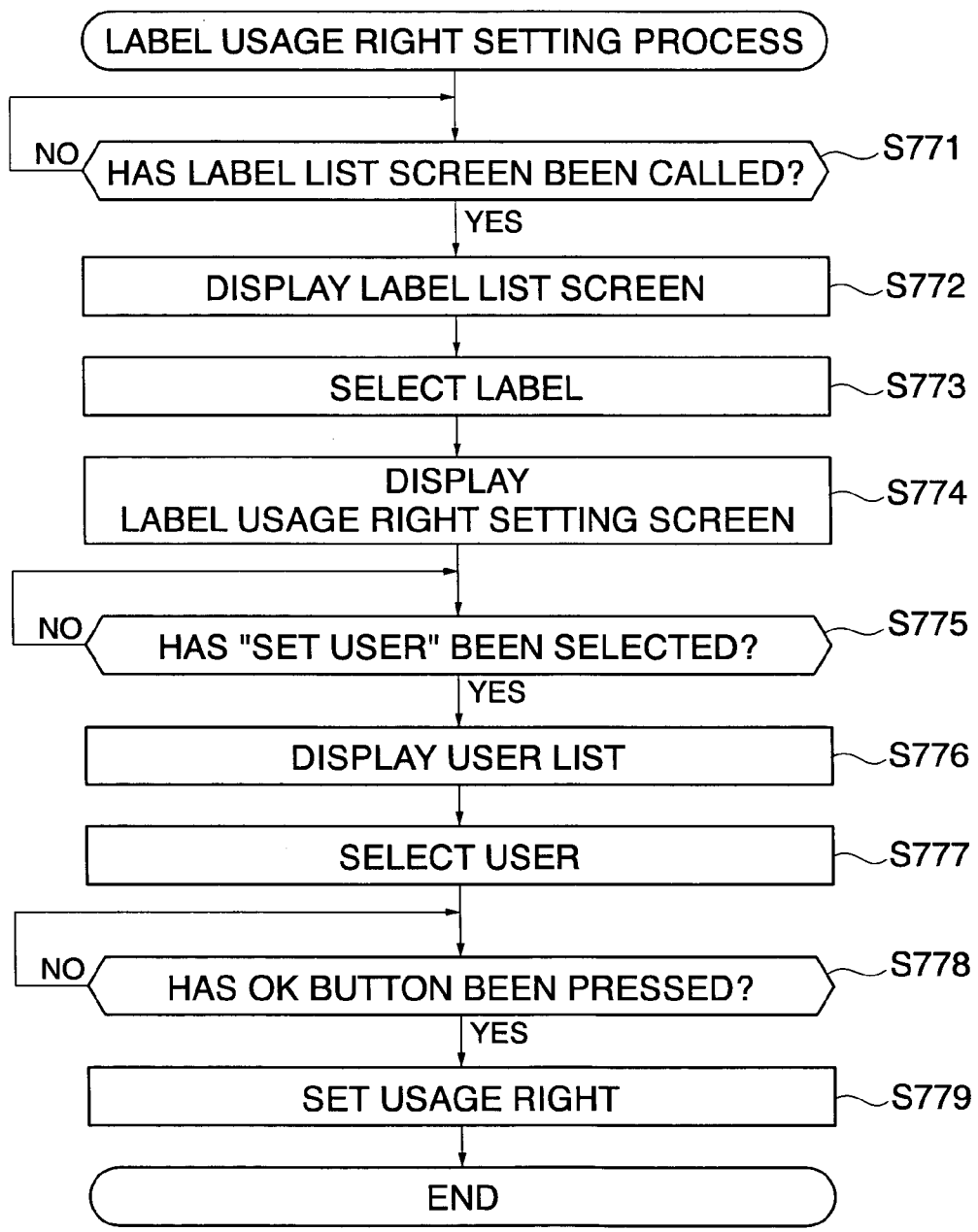
FIG. 30 is a flow chart showing a label usage right setting process in a step S506 in FIG. 19.
Figure 34:
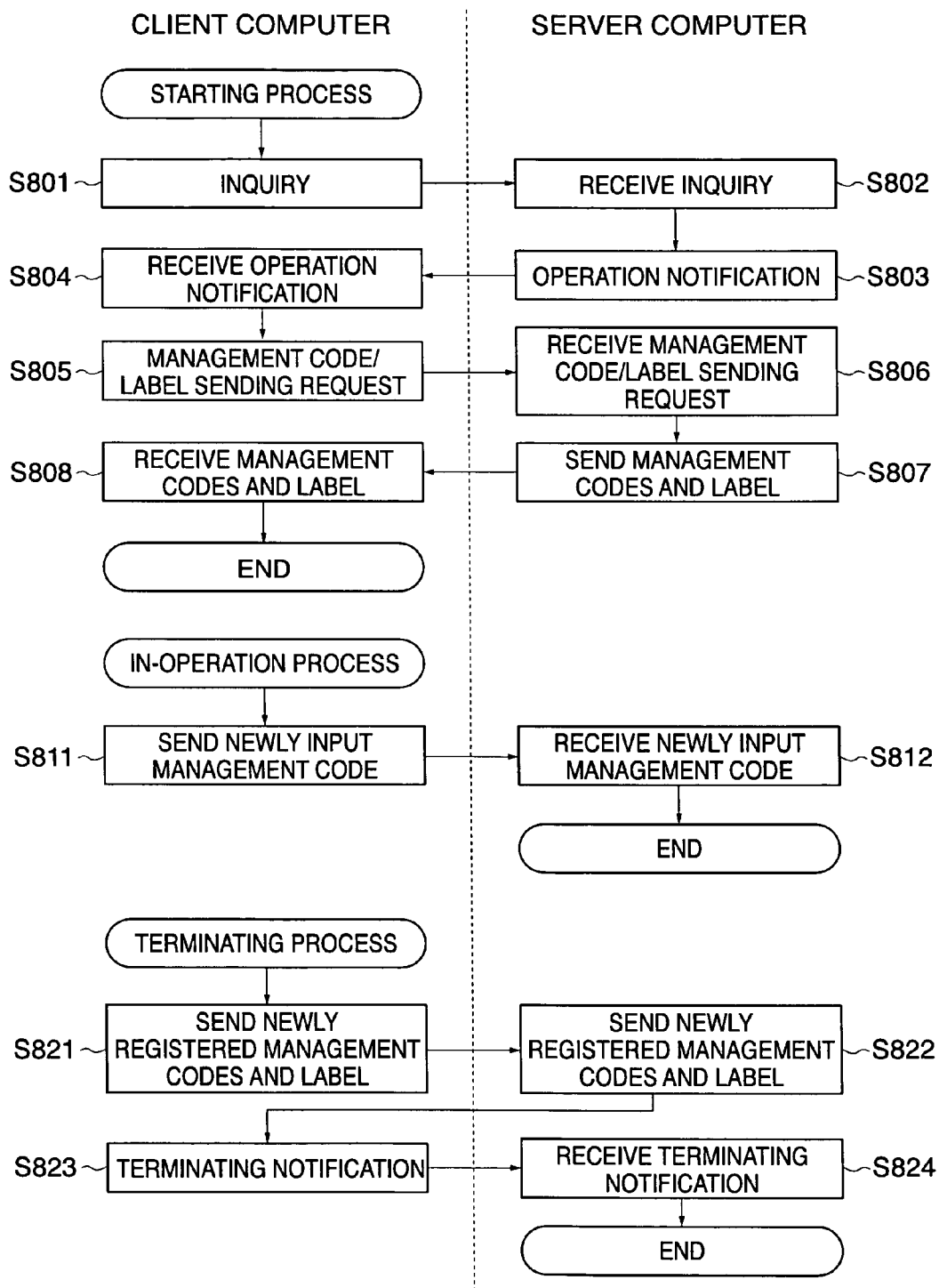
FIG. 34 is a flow chart showing a client communicating process in a step S502 in FIG. 19.

In the client communicating process, the server computer 200 communicates with the client computer 100 (FIG. 34). In the management code registering process, the server computer 200 registers management codes shown in FIG. 20, described later (FIG. 22). In the management code usage right setting process, the server computer 200 defines usage rights for the management codes with respect to individual users (FIG. 25). In the label registering process, the server computer 200 registers labels in FIG. 20, described later (FIG. 28). In the label usage right setting process, the server computer 200 defines usage rights for the labels (FIG. 30).

FIG. 20 is a diagram showing the data structure of the management codes registered in the step S503 in FIG. 19.

In FIG. 20, the management codes are defined in three classes (groups). For example, in the first class, management codes A1, A2, A3, A4, . . . and usage rights for the respective management codes, i.e. information indicative of users who can use the management codes are stored. A plurality of users can be set for one management code, and all the set users have a usage right for the management code. Similarly, management codes B1, B2, B3, . . . and usage rights therefor are stored in the second class, and management codes C1, C2, C3, . . . and usage rights therefor are stored in the third class.

The management codes defined in the three classes are used-in combination; one management code per class. For example, a combination of the management codes A1, B4, and C5 is used for a certain job. Specifically, to classify service and client information in e.g. a law firm, classes of management codes are grouped into client (first class), matter (second class), and sub-matter (third class), and management codes are defined in each class as below.

Client: Mr. Suzuki, Mr. Tanaka, Tokyo Office, Shibuya Branch Office, Midori Trading Co., Ltd., . . .

Matter: Civil Affairs, Criminal Affairs, Trading, Legal Work, . . .

Sub-matter: Divorce, Traffic Accident, Injury, Theft, Succession of Property, Finance, Patent Infringement, Copyright, . . .

Expenses for printing operations can be charged in units classified according to service contents; e.g. (Mr. Suzuki, Civil Affairs, Succession of Property) and (Midori Trading Co., Ltd., Legal Work, Patent Infringement).

FIG. 21 is a diagram showing the data structure of the labels registered in the step S505 in FIG. 19.

In FIG. 21, the labels as identifiers are defined for management code groups each comprised of a plurality of management codes, and used to facilitate designation of management codes for managing usage status.

For example, in FIG. 21, a label L1 is defined for a management code group comprised of the management codes A4, B3, and C1, and usage rights are set for users 1, 2, and 3. Similarly, a label L2 is defined for a management code group comprised of the management codes A2, B2, and C5, and a label L3 is defined for a management code group comprised of the management codes A5, B4, and C3.

FIG. 22 is a flow chart showing the management code registering process in the step S503 in FIG. 19.

Figure 23:
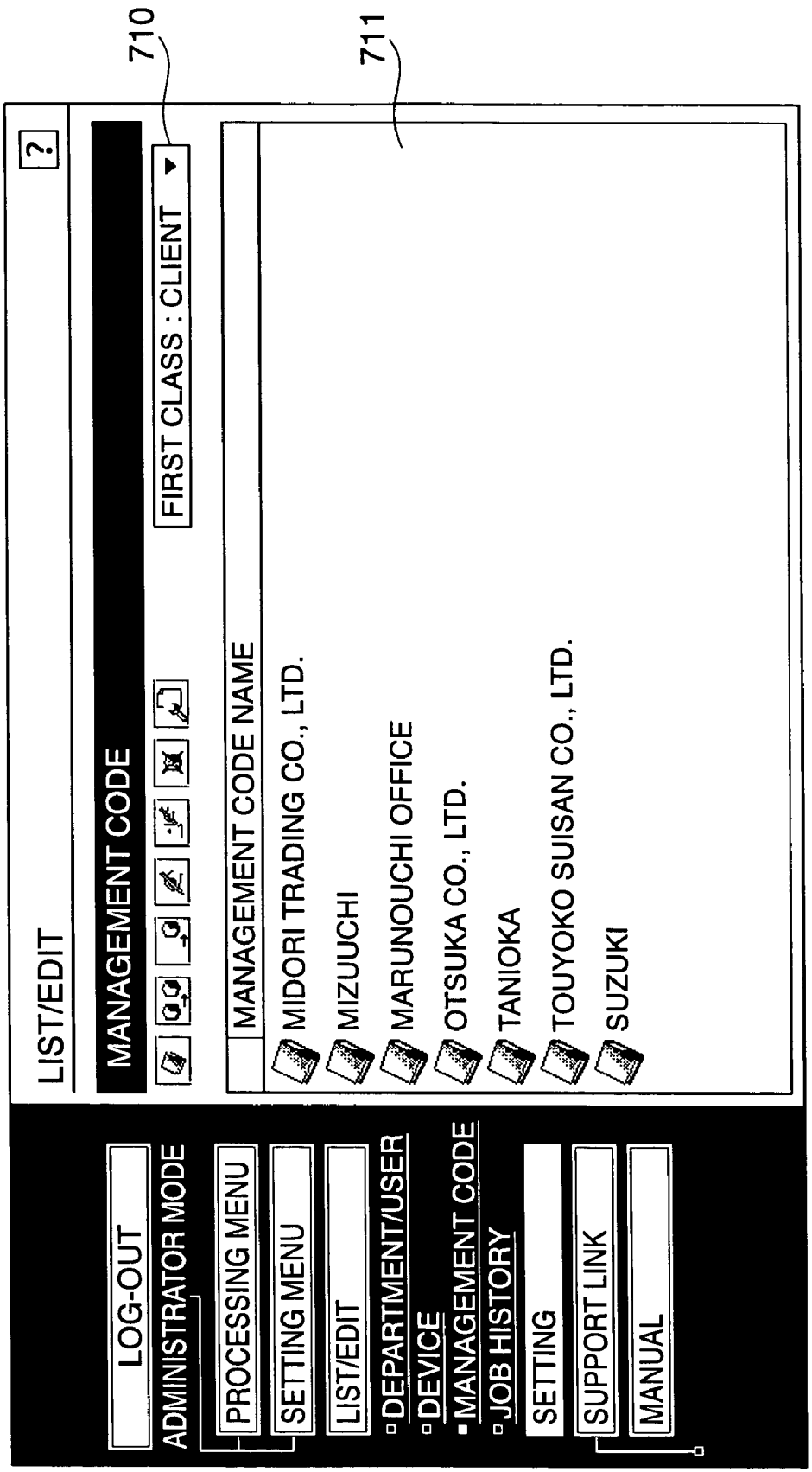
FIG. 23 is a view showing an example of a management code list screen displayed in a step S702 in FIG. 22.

As shown in FIG. 22, when a management code list screen is called (YES to a step S701), the server computer 200 displays a management code list screen of FIG. 23 (step S702). When the user designates a class of management codes to be registered in a combobox 710 of the management code list screen (step S703), the server computer 200 displays a management code list 711 comprised of names of management code registered in the designated class (step S704) (FIG. 23). In FIG. 23, "First Class: Client" is selected in the combobox 710, and management code names such as "Midori Trading Co., Ltd." are displayed in the management code list 711.

Figure 24:
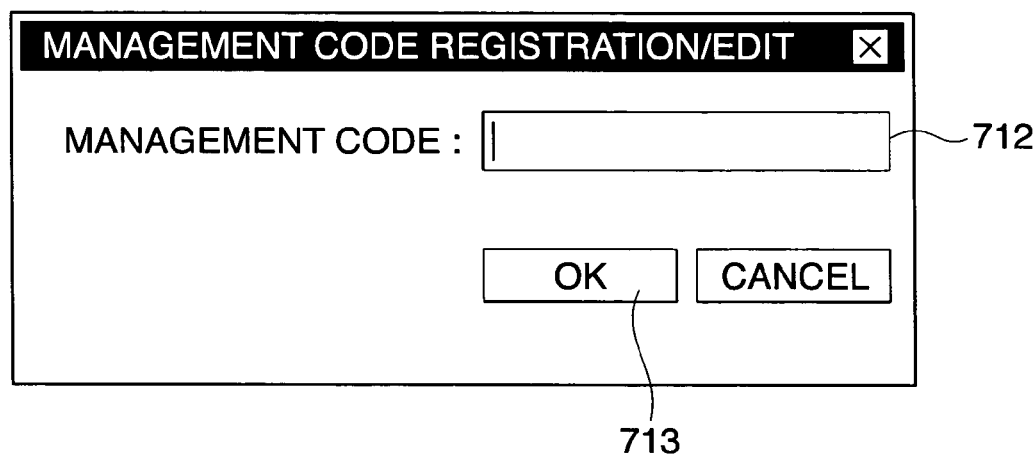
FIG. 24 is a view showing an example of a management code input dialogue displayed in a step S706 in FIG. 22.

Then, when "Register management code" is selected from a menu, not shown, on the management code list screen (YES to a step S705), the server computer 200 displays a management code input dialogue of FIG. 24 (step S706). When the user inputs a management code into an edit box 712 of the management code input dialogue (step S707) and presses an OK button 713 (step S708), the server computer 200 registers the input management code (step S709) and terminates the process.

FIG. 25 is a flow chart showing the management code usage right setting process in the step S504 in FIG. 19.

As shown in FIG. 25, when the management code list screen is called (YES to a step S721), the server computer 200 displays the management code list screen of FIG. 23 (step S722). When the user designates a class of management codes to be registered in the combobox 710 of the management code list screen (step S723), the server computer 200 displays the management code list 711 comprised of registered management code names in the designated class.

Figure 26:
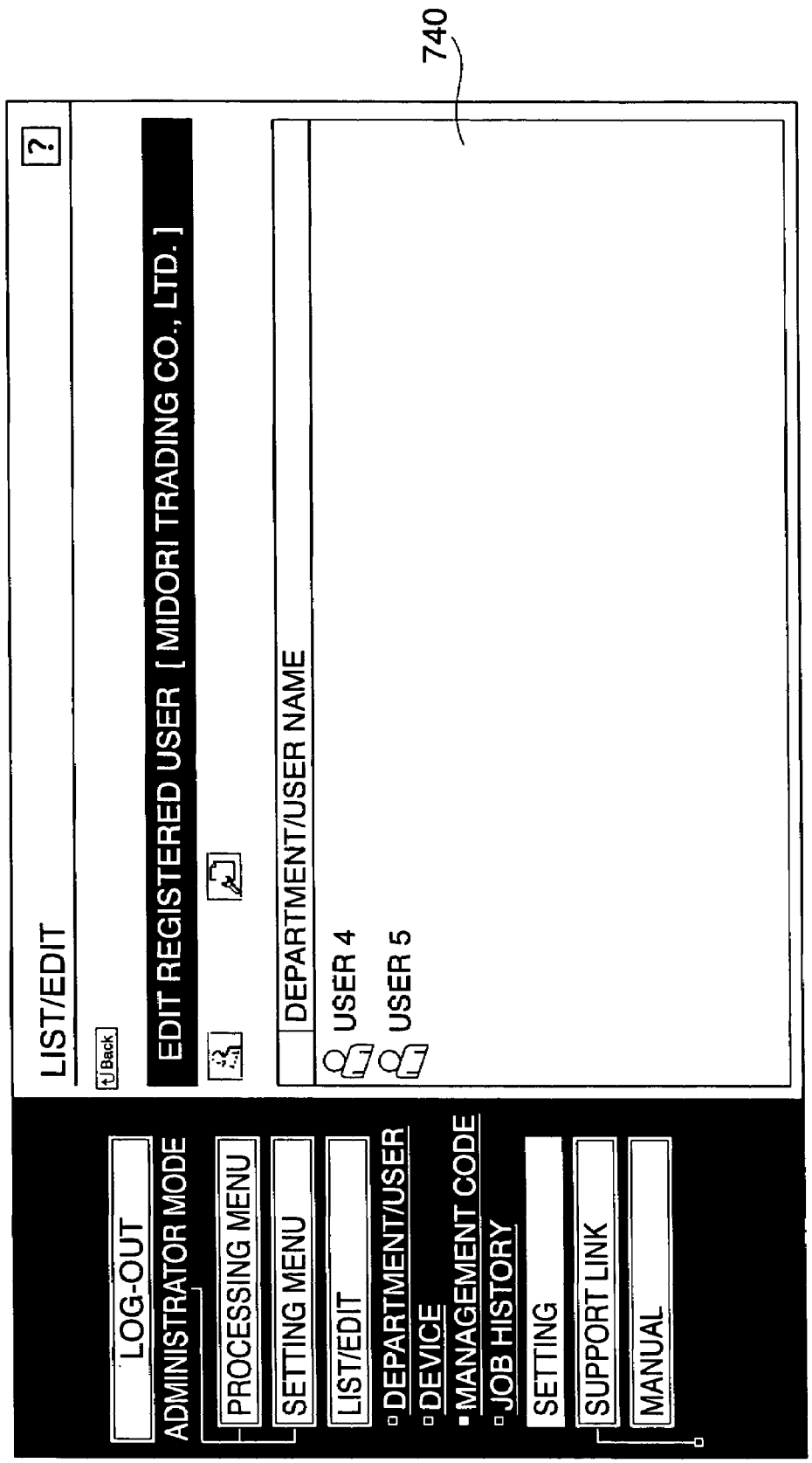
FIG. 26 is a view showing an example of a management code usage right setting screen displayed in a step S726 in FIG. 25.

Then, the user selects a management code for which usage rights are to be set from the management code list 711 and selects "registered users" from a menu, not shown (step S725), the server computer 200 displays a management code usage right setting screen of FIG. 26 (step S726). A user list 740 comprised of names of users for which the selected management code has been set is displayed on the management code usage right setting screen. On the management code usage right setting screen, users who can use a selected one management code are set for the code, so that usage rights are defined for the code. For example, in FIG. 26, User 4 and User 5 are set for a management code "Midori Trading Co., Ltd.".

Figure 27:
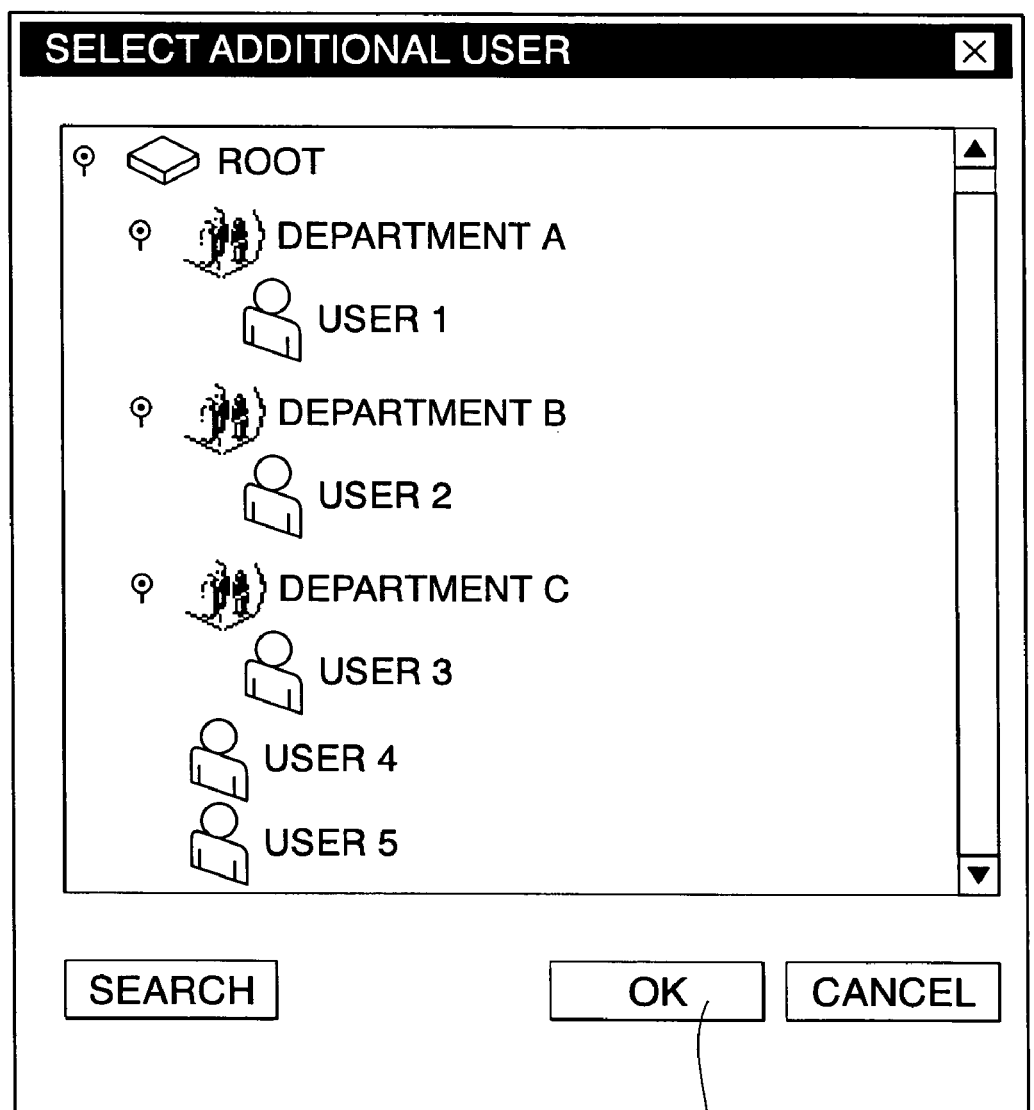
FIG. 27 is a view showing an example of a user list displayed in a step S728 in FIG. 25.

Then, when an item "set user" in a menu, not shown, on the management code usage right setting screen is pressed (YES to a step S727), the server computer 200 displays a user list appearing in FIG. 27 (step S728). When the user selects one or more users to be set from the user list (step S729) and presses an OK button 741 (YES to a step S730), the server computer 200 sets usage rights for the selected user(s) (step S731) and terminates the process.

Figure 29:
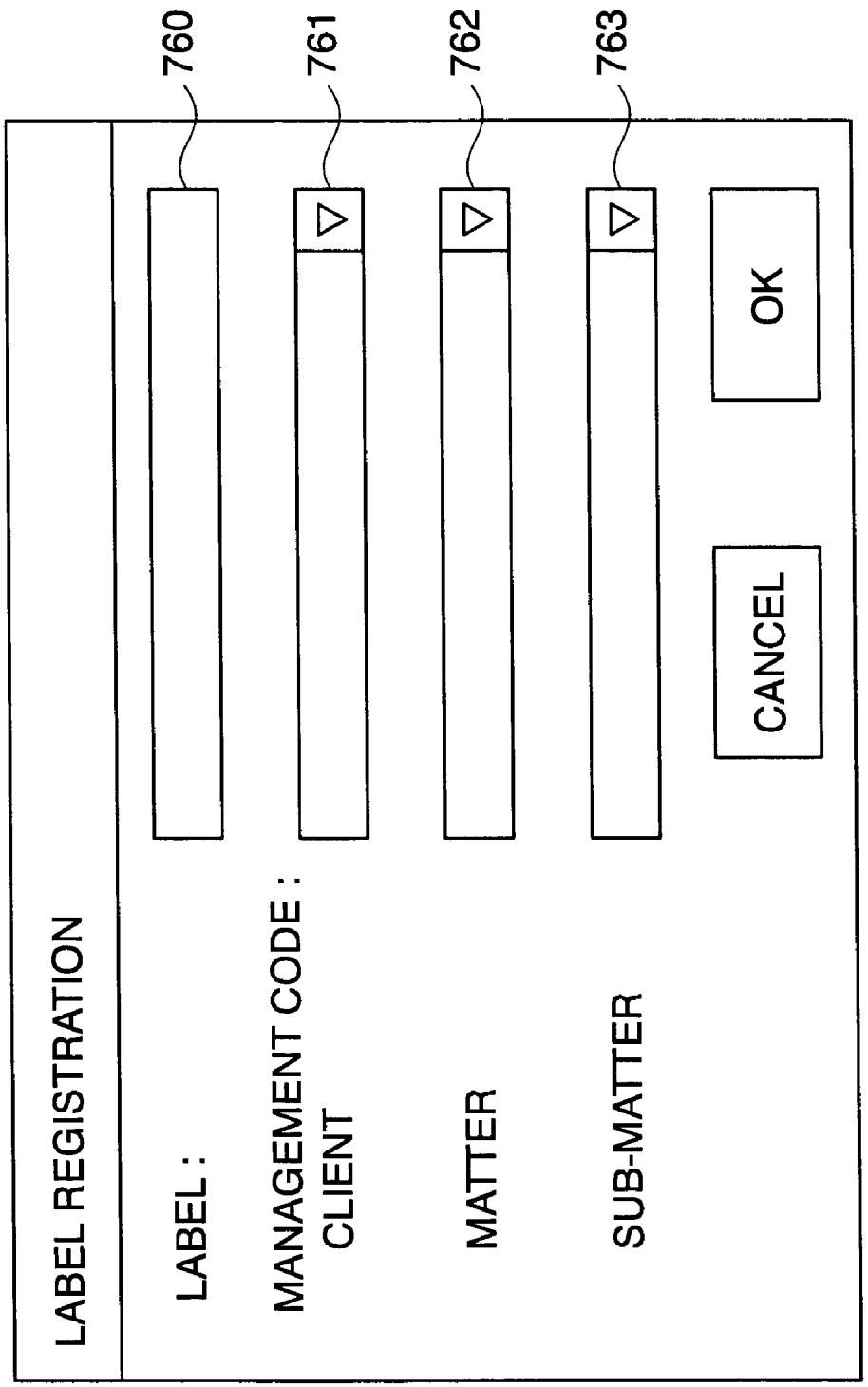
FIG. 29 is a view showing an example of a label registration screen displayed in a step S752 in FIG. 28.

FIG. 28 is a flow chart showing the label registering process in the step S505 in FIG. 29.

As shown in FIG. 28, when a label registering screen is called (YES to a step S751), the server computer 200 displays the label registration screen of FIG. 29 (step S752). The user selects management codes of respective three classes (Client, Matter, and Sub-matter) in comboboxes 761 to 763 on the label registering screen (step S753), inputs a label for the selected management codes of the three classes into an edit box 760 (step S754), and presses an OK button (YES to a step S755), the server computer 200 registers the one selected label input for the selected management codes of the three classes (step S756) and terminates the process.

FIG. 30 is a flow chart showing the label usage right setting process executed in the step S506 in FIG. 19.

Figure 31:
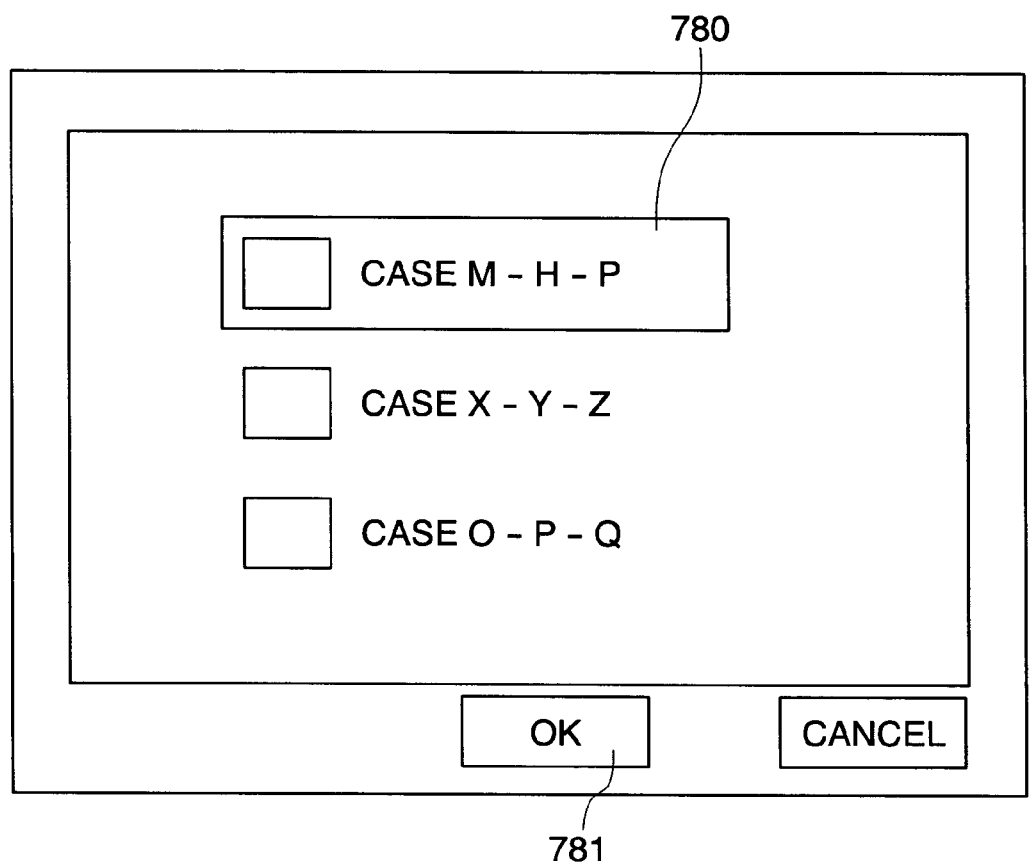
FIG. 31 is a view showing an example of a label list screen displayed in a step S772 in FIG. 30.
Figure 32:
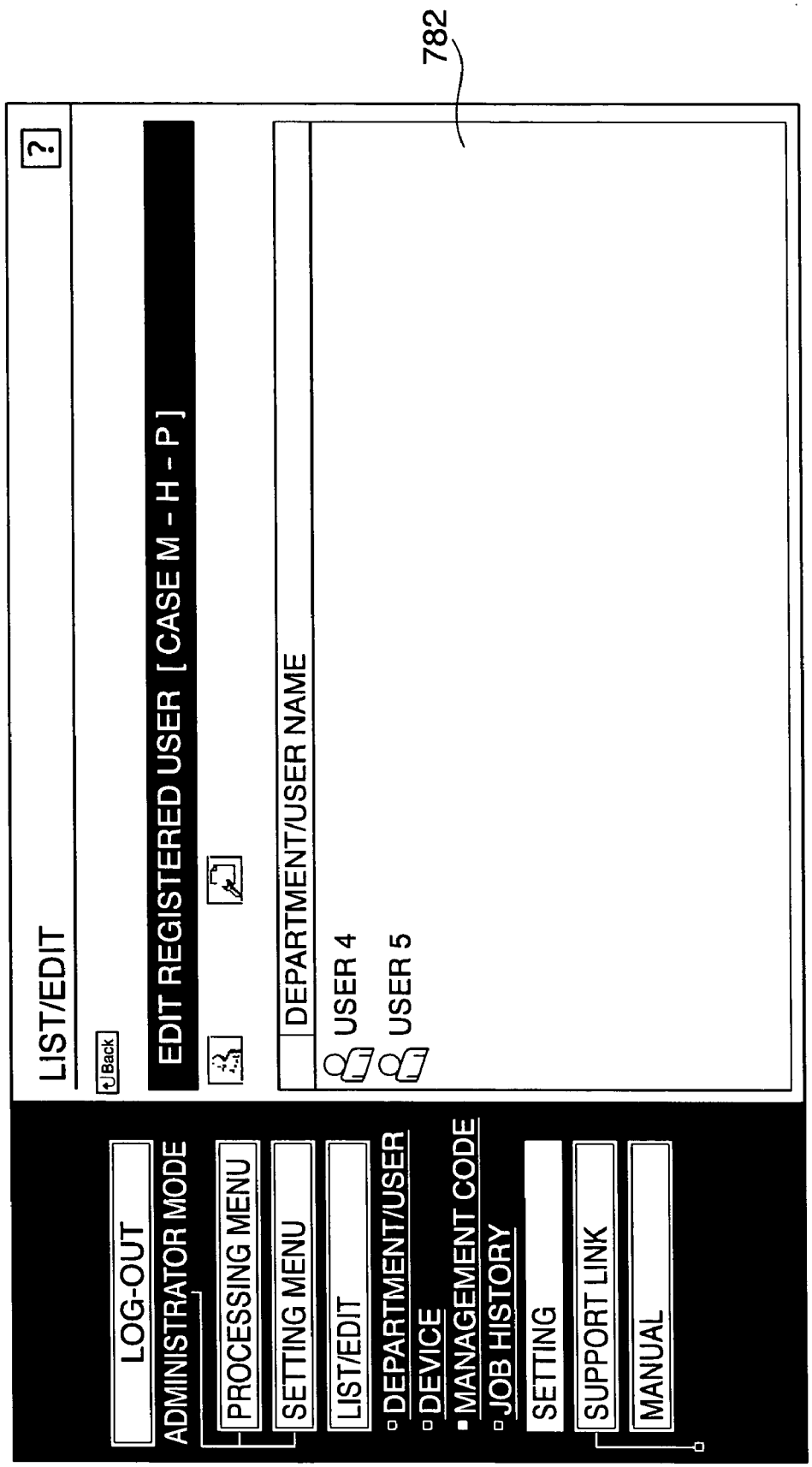
FIG. 32 is a view showing a label usage right setting screen displayed in a step S774 in FIG. 30.

As shown in FIG. 30, when a label list screen is called (YES to a step S771), the server computer 200 displays the label list screen of FIG. 31 (step S772). When the user selects a label 780 for which usage rights are to be set from the label list screen and pressed an OK button 781 (step S773), the server computer 200 displays a label usage right setting screen of FIG. 32 (step S774).

A user list 782 comprised of names of users set for the selected label is displayed on the label usage right setting screen. On the label usage right setting screen, users who can use a selected one label are set for the label, so that usage rights are defined for the label. For example, in FIG. 32, usage rights of User 4 and User 5 are set for a label "Case M-H-P".

Figure 33:
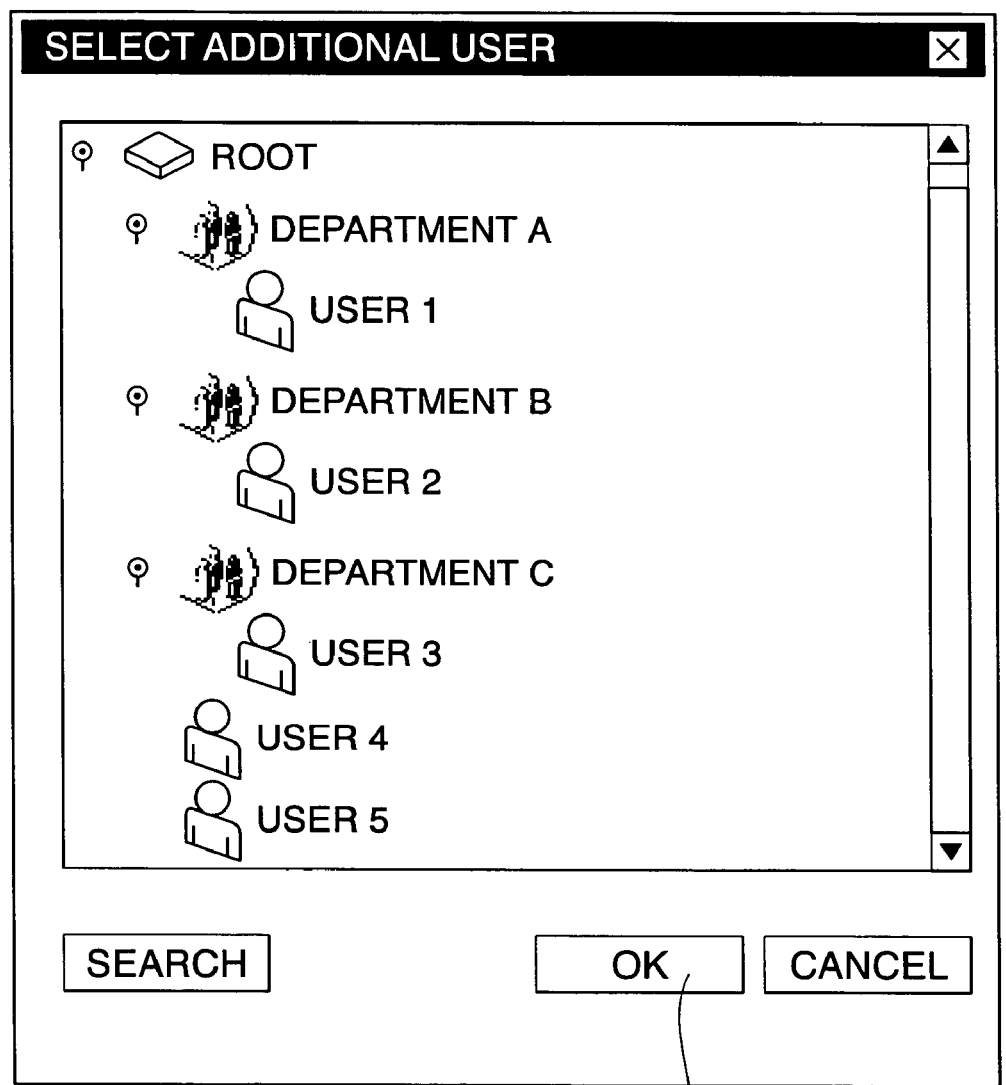
FIG. 33 is a view showing an example of a user list displayed in a step S776 in FIG. 30.

Then, when the user selects an item "set users" from a menu, not shown, on the label setting screen (YES to a step S775) the server computer 200 displays a user list appearing in FIG. 33 (step S776). When the user selects users for which usage rights are to be set from the user list (step S777) and presses an OK button 783 (YES to a step 778), the server computer 200 sets usage rights for the selected users (step S779) and terminates the process.

Only the sever computer 200 can set usage rights for labels.

FIG. 34 is a flow chart showing the client communicating process in the step S502 in FIG. 19.

As shown in FIG. 34, the client communicating process is comprised of a starting process carried out to start the client computer 100, an in-operation process carried out during operation, and a terminating process carried out to terminate the process.

In the starting process, the client computer 100 inquires of the server computer 200 whether or not the server computer 200 has been started (step S801). The server computer 200 receives the inquiry from the client computer 100 (step S802) and notifies the client computer 100 that the server computer 200 is normally operating (step S803).

Then, the client computer 100 receives the notification that the server computer 200 is normally operating (step 804) and requests the server computer 200 to send management codes and labels registered in the server computer 200 (step S805). The server computer 200 receives the management code and label sending request from the client computer 100 (step S806), refers to user information on the client computer 100, and sends management codes and labels which can be used by the user to the client computer 100 (step S807). The client computer 100 receives the management codes and the labels from the server computer 200 (step S808) and terminates the process.

In the in-operation process, to register a management code newly input by the user in the case where the management code is designated during printing, the client computer 100 sends the newly input management code to the server computer 200 (step S811). The server computer 200 receives the management code newly input in the client computer 100 (step S811) and terminates the process. The newly input management code exists on a memory of the client computer 100. Also, the client computer 100 can newly define a label.

In the terminating process, the client computer 100 sends a label newly registered by the client computer 100 and management codes corresponding to the label to the server computer 200 (step S821). The server computer 200 receives the sent label and management codes corresponding to the label and stores them in a predetermined database (step S822).

Then, at the time of termination of the process, the client computer 100 sends a terminating notification to the server computer 200 (step S823). The server computer 200 receives the terminating notification from the client computer 100 (step S821) and terminates the process.

Figure 35:
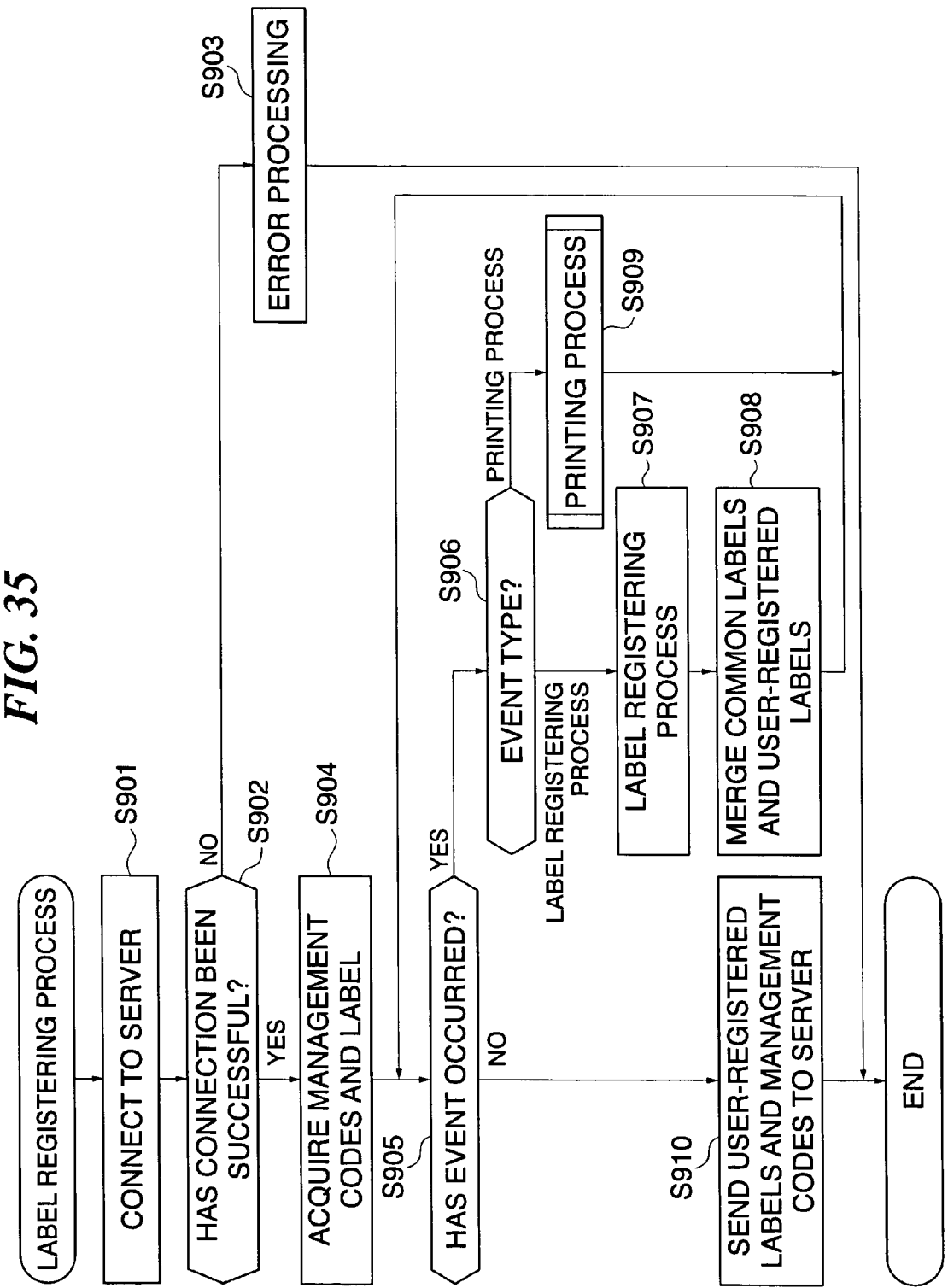
FIG. 35 is a flow chart showing a label registering process executed by the client computer in FIG. 1.

FIG. 35 is a flow chart showing the label registering process carried out by the client computer 100.

As shown in FIG. 35, after being started, the client computer 100 connects to the server computer 200 (step S901) and determines whether connection with the server computer 200 has been successful or not (step S902). If the connection with the server computer 200 has not been successful, the client computer 100 performs suitable error processing (step S903) and terminates the process.

On the other hand, if the connection with the server compute 200 has been successful, the client computer 100 acquires management codes, labels, and various setting information from the server computer 200 (step S904). The management codes and the labels which are acquired on this occasion are those for which usage rights are given to a user who has logged in the client computer 100. The acquired management codes and the labels are used in inputting management codes during printing.

Then, the client computer 100 determines whether an event has occurred or not (step S905). If an event has occurred, the type of the event is judged (step S906). If the event which has occurred is the label registering process, the label registering process is carried out (step S907), and server-registered labels and user-registered labels are merged (step S908). The process then returns to the step S905. In the same manner as the label registering process (FIG. 28) carried out by the server computer 200, the client computer 100 can also register labels. In this case, usage rights for the registered labels are given to a user who is currently operating the client computer 100, i.e. a user who has logged in the client computer 100.

If it is determined in the step S906 that the event which has occurred is a printing process, a printing process in FIG. 36, described later, is carried out (step S909), and the process then returns to the step S905.

If it is determined in the step S905 that no event has occurred, the labels registered in the client computer 100 by the user and management codes corresponding to the labels are sent to the server computer 200 (step S910). The process is then terminated.

According to the process of FIG. 35, if the event which has occurred is a label registering process, the label registering process is carried out (step S907), and labels registered in the server computer 200 and labels registered by the user are merged (step S908). If no event has occurred (NO to the step S905), the labels registered in the client computer 100 by the user and management codes corresponding to the labels are sent to the server computer 200 (step S910). This makes it more convenient to manage and use management codes and improves user-friendliness and convenience in printing management using the management codes.

Figure 36:
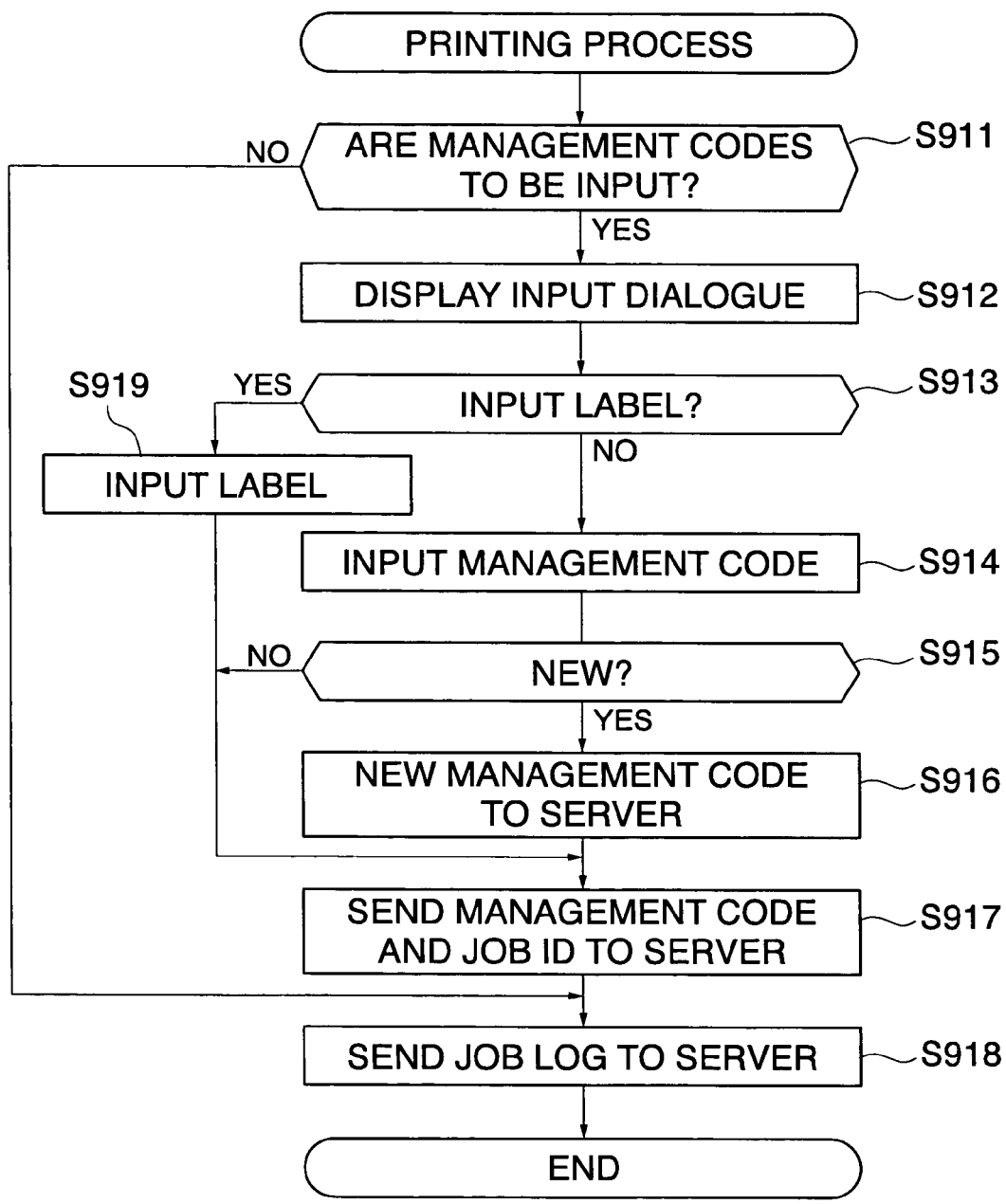
FIG. 36 is a flow chart showing a printing process in a step S909 in FIG. 35.

FIG. 36 is a flow chart showing the printing process carried out in the step S909 in FIG. 35.

As shown in FIG. 36, it is determined whether or not management codes are to be input in the client computer 100 when carrying out printing (step S911). If management codes are to be input, selection screens of FIGS. 37 and 38 are displayed in printing so as to prompt the user to determine whether management codes are to be designated by selecting a label or management codes are to be directly designated.

Figure 37:
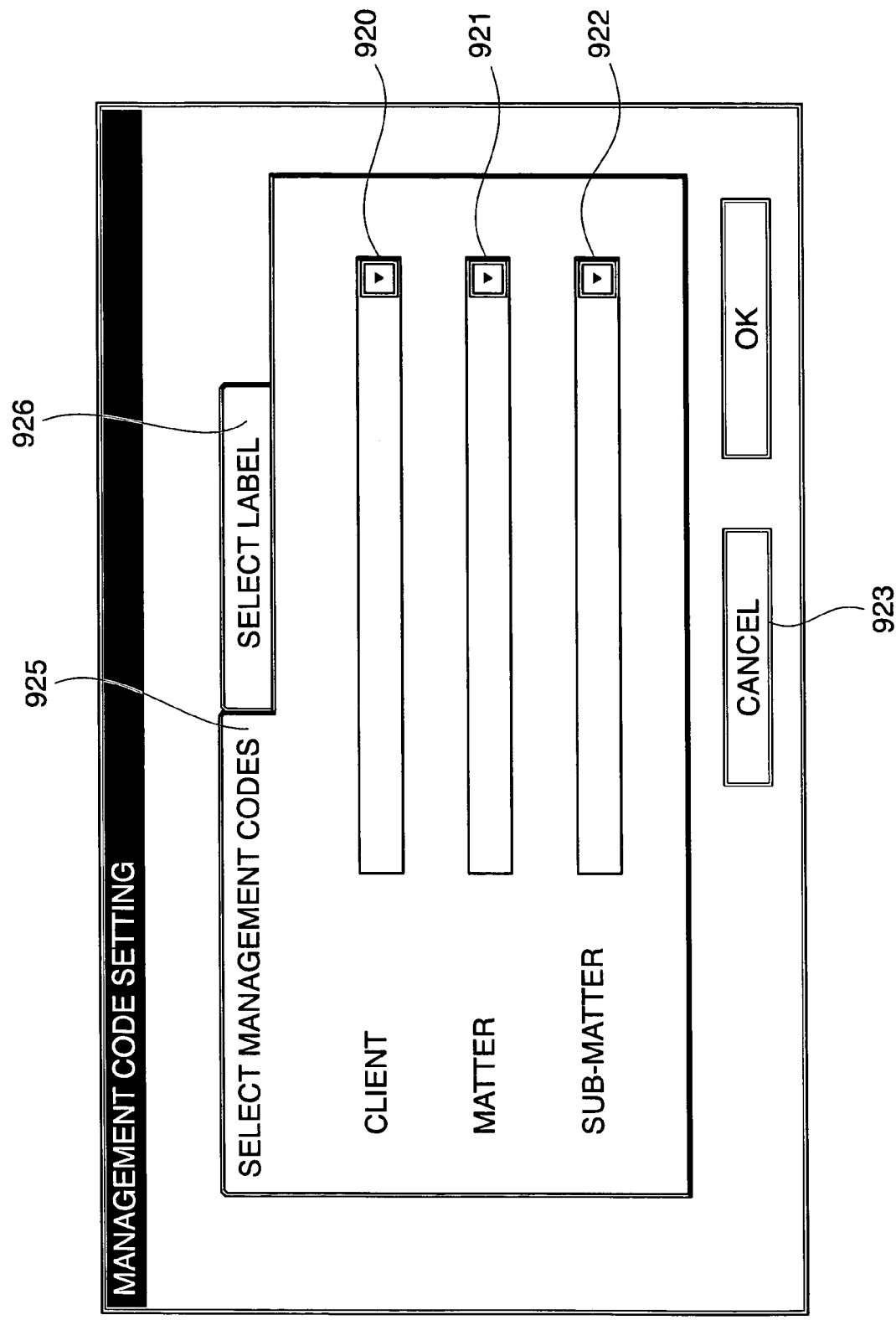
FIG. 37 is a view showing an example of a management code input dialogue displayed in a step S912 in FIG. 36.

The screen of FIG. 37 is for directly designating management codes, and the screen of FIG. 38 is for selecting a label to set management codes corresponding thereto. The screens of FIGS. 37 and 38 can be switched to each other using tab sheets. When a cursor is set to a tab sheet 926 in FIG. 37 using an input means such as a mouse and then a predetermined mouse button is pressed, the screen of FIG. 37 is switched to the screen of FIG. 38. On the other hand, when the cursor is set to a tab sheet 925 and the predetermined mouse button is pressed, the screen of FIG. 38 is switched to the screen of FIG. 37.

It should be noted that information indicative of whether management codes are to be input or not, which is obtained in the step S911, is set in the server computer 200; the information may be included in setting information loaded from the server computer 200 by the client computer 100 upon start.

If it is determined in the step S911 that management codes are to be input in printing, a management code input dialogue in FIG. 37 is displayed (step S912), and it is determined whether or not management codes are to be input by inputting a registered label (step S913).

If management codes are not to be input by inputting a label, the user inputs management codes of respective three classes into comboboxes 920 to 922 of the management code input dialogue in FIG. 37 and presses an OK button 923 (step S914). The client computer 100 then determines whether the input management codes are new or not (step S915).

If the input management codes are new, i.e. if the input management codes are not registered, they are sent to the server computer 200 (step S917). In the comboboxes 920 to 922, registered management codes can be selected, and new management codes can be edited.

Then, the input management codes and a job ID of a print job are sent to the server computer 200 (step S917), and a job log is sent to the server computer 200 (step S918). The process is then terminated.

If it is determined in the step S913 that management codes are to be input by inputting a label, a label is input into a combobox 924 of a label input dialogue in FIG. 38 to input management codes (step S919), and the steps S917 and S918 are executed to terminate the process. In FIG. 38, a label "Case M-H-P" is given to a set of three management codes (Midori Trading Co., Ltd., Legal Work, and Patent Infringement), and selecting this label obtains the same effect as selection of the three management codes (Midori Trading Co., Ltd., Legal Work, and Patent Infringement).

According to the process of FIG. 36, the client computer 100 inputs a label into the combobox 924 of the label input dialogue to input management codes (step S919) and sends the input management codes and a job ID of a print job to the server computer 200 (step S917). This improves convenience in managing and using management codes and improves user-friendliness and convenience in printing management using the management codes.

It should be noted that although in the present embodiment, there are management codes of three classes, the present invention is not limited to this.

Further, although in the present embodiment, a label registered in the client computer 100 is sent to the server computer 200 each time a label is registered by the client computer 100, the present invention is not limited to this, but a registered label may be sent to the server computer 200 just before the client computer 100 is turned off.

Further, although in the present embodiment, usage rights for management codes and labels are set in the server computer 200 by the management usage right setting process of FIG. 25, it may be arranged such that usage rights for labels are not set by users, but usage rights are set using a logical sum of usage rights for respective management codes.

For example, a usage right for a label L1 is set for a logical sum (User 2, User 3, User 4, and User 5) of usage rights for respective management codes in the case where the label L1 is defined for the following three management codes:

(Management code: A4, Usage right: User 4)
(Management code: B2, Usage right: User 2 and User 3)
(Management code: C5, Usage right: User 5)

The above-described program for specifying counting units using a plurality of management codes and counting job information, used in the present invention, includes a program for realizing the label registering process carried out by the client computer 100 in FIG. 1. Also, the program controls a process in which a plurality of management codes and a label for use in job counting are managed in association with each other, and a selection screen for prompting a user to determine whether the plurality of management codes managed by the program are to be designated, or the label managed by the program is to be designated is displayed, when counting the job information. Further, the program controls a process in which the selection screen of FIG. 37 or FIG. 38 is selectively displayed in response to a printing instruction from a user.

Further, it is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-134549 filed Apr. 28, 2004, which is hereby incorporated by reference herein.

What is claimed is:

1. A managing apparatus for managing management codes set in a job executed by an image processing apparatus, wherein the management codes are different from print settings, including a sheet size and a sheet type, set for the job, the managing apparatus comprising:
a management code registering device adapted to register the management codes, wherein the respective management codes are set usage rights and grouped into at least one of a plurality of classes;
a label registering device adapted to register a label defined by a combination comprised of a group of a plurality of management codes obtained by selecting one management code per class from the management codes, wherein the label is used for designating a destination for charging expense; and
a setting device adapted to set a usage right to the label based on the usage rights of the respective management codes comprising the combination,
wherein the destination for charging the expense designated by the management codes set in the job is used to charge any expense resulting from a counting based on job log information corresponding to the job executed by the image processing apparatus.

2. The managing apparatus according to claim 1, wherein the setting device sets the usage right to the registered label using a logical sum of the respective management codes of the respective management codes comprising the combination.

3. The managing apparatus according to claim 1, wherein:
the management apparatus further communicates with a client computer which generates the job,
the label registering device registers, as the label, another label received from the client computer,
the another label is defined by another combination comprised of another group of a plurality of management codes obtained by selecting one management code per class from the management codes, and
the setting device sets to the another label a usage right given to a user who has logged in the client computer.

4. A method of controlling a managing apparatus for managing management codes set in a job executed by an image processing apparatus, wherein the management codes are different from print settings, including a sheet size and a sheet type, set for the job, the method comprising:
a management code registering step of registering management codes, which are set usage rights and grouped into at least one of a plurality of classes;
a labeling step of registering a label defined by a combination comprised of a group of a plurality of management codes obtained by selecting one management code per class from the management codes, wherein the label is used for designating a destination for charging expense; and
a setting step of setting a usage right to the label based on the usage rights of the respective management codes comprising the combination,
wherein the destination for charging the expense designated by the management codes set in the job is used to charge any expense resulting from a counting based on job log information corresponding to the job executed by the image processing apparatus, and
wherein the managing apparatus executes the management code registering step, the labeling step, and the setting step.

5. The method according to claim 4, wherein the setting step sets the usage right to the registered label using a logical sum of the respective management codes of the respective management codes comprising the combination.

6. The method apparatus according to claim 4, wherein:
the management apparatus further communicates with a client computer which generates the job,
the label registering step registers, as the label, another label received from the client computer,
the another label is defined by another combination comprised of another group of a plurality of management codes obtained by selecting one management code per class from the management codes, and
the setting step sets to the another label a usage right given to a user who has logged in the client computer.

7. A computer-readable medium storing a computer program executable by a managing apparatus for managing management codes set in a job executed by an image processing apparatus, wherein the management codes are different from print settings, including a sheet size and a sheet type, set for the job, the computer program comprising:

a management code registering instruction configured to register management codes, which are set usage rights and grouped into at least one of a plurality of classes;

a labeling instruction configured to register a label defined by a combination comprised of a group of a plurality of management codes obtained by selecting one management code per class from the management codes, wherein the label is used for designating a destination for charging expense; and a setting instruction configured to set a usage right to the label based on the usage rights of the respective management codes comprising the combination, wherein the destination for charging the expense designated by the management codes set in the job is used to charge any expense resulting from a counting based on job log information corresponding to the job executed by the image processing apparatus.

8. A managing system comprising:

a managing apparatus for managing management codes set in a job executed by an image processing apparatus, wherein the management codes are different from print settings, including a sheet size and a sheet type, set for the job; and a client computer for generating the job, wherein the managing apparatus comprises:

a management code registering device adapted to register the management codes, wherein the respective management codes are set usage rights and grouped into at least one of a plurality of classes;

a label registering device adapted to register a label defined by a combination comprised of a group of a plurality of management codes obtained by selecting one management code per class from the management codes, wherein the label is used for designating a destination for charging expense; and a setting device adapted to set a usage right to the label based on the usage rights of the respective management codes comprising the combination, and wherein the destination for charging the expense designated by the management codes set in the job is used to charge any expense resulting from a counting based on job log information corresponding to the job executed by the image processing apparatus, and wherein the client computer comprises:

an obtaining device adapted to, when sending the job to the image processing apparatus, obtain another label input by a user who has logged in the client computer, wherein the another label is defined by another combination comprised of another group of a plurality of management codes obtained by selecting one management code per class from the management codes; and a sending device adapted to send the another label to the managing apparatus, wherein the label registering device registers, as the label, the another label received from the client computer, and wherein the setting device sets to the another label a usage right given to the user.

9. A method of controlling a managing system comprising a managing apparatus for managing management codes set in a job executed by an image processing apparatus, and a client computer for generating the job, wherein the management codes are different from print settings, including a sheet size and a sheet type, set for the job, the method comprising:

a management code registering step of registering the management codes, wherein the respective management codes are set usage rights and grouped into at least one of a plurality of classes;

a label registering step of registering a label defined by a combination comprised of a group of a plurality of management codes obtained by selecting one management code per class from the management codes, wherein the label is used for designating a destination for charging expense;

a setting step of setting a usage right to the label based on the usage rights of the respective management codes comprising the combination, wherein the destination for charging the expense designated by the management codes set in the job is used to charge any expense resulting from a counting based on job log information corresponding to the job executed by the image processing apparatus;

an obtaining step of, when sending the job to the image processing apparatus, obtaining another label input by a user who has logged in the client computer, wherein the another label is defined by another combination comprised of another group of a plurality of management codes obtained by selecting one management code per class from the management codes; and a sending step of sending the another label to the managing apparatus, wherein the label registering step registers, as the label, the another label received from the client computer, wherein the setting step sets to the another label a usage right given to the user, wherein the managing apparatus executes the management code registering step, the label registering step, and the setting step, and wherein the client computer executes the obtaining step and the sending step.

10. The managing apparatus according to claim 1, wherein the management codes are respectively set to the plurality of classes to designate the destination for charging the expense, including units of the destination to be charged to.

11. The method according to claim 4, wherein the management codes are respectively set to the plurality of classes to designate the destination for charging the expense, including units of the destination to be charged to.

12. The computer-readable medium according to claim 7, wherein the management codes are respectively set to the plurality of classes to designate the destination for charging the expense, including units of the destination to be charged to.

13. The managing system according to claim 8, wherein the management codes are respectively set to the plurality of classes to designate the destination for charging the expense, including units of the destination to be charged to.

14. The method according to claim 9, wherein the management codes are respectively set to the plurality of classes to designate the destination for charging the expense, including units of the destination to be charged to.

* * * * *